United States Patent [19]

Konno et al.

[11] Patent Number: 4,819,161

[45] Date of Patent: Apr. 4, 1989

[54] METHOD OF AUTOMATIC GENERATION OF A COMPUTER FOR NUMERICAL SIMULATION OF PHYSICAL PHENOMENON

[75] Inventors: Chisato Konno, Inagi; Yukio Umetani, Hachioji; Hiroyuki Hirayama, Fuchu; Tadashi Ohta, Higashimurayama, all of Japan

[73] Assignees: Hitachi, Ltd.; Hitachi VLSI Eng. Corp., both of Tokyo, Japan

[21] Appl. No.: 900,424

[22] Filed: Aug. 26, 1986

[30] Foreign Application Priority Data

Mar. 10, 1986 [JP] Japan .................................. 61-50380

[51] Int. Cl.$^4$ .............................................. G06F 7/00
[52] U.S. Cl. ...................................... 364/300; 364/578
[58] Field of Search ................ 364/702, 704, 300, 578

[56] References Cited

U.S. PATENT DOCUMENTS

| | | | |
|---|---|---|---|
| 4,107,773 | 8/1978 | Gilbreath et al. | 364/704 |
| 4,150,434 | 4/1979 | Shibayama et al. | 364/728 |
| 4,414,640 | 11/1983 | Yabuuchi et al. | 364/702 |
| 4,611,312 | 9/1986 | Ikeda | 364/421 |

OTHER PUBLICATIONS

Transactions of 26th Conference of Information Processing Society of Japan, pp. 427–428, 429–430, 431–432 (first half of 1983).
Transactions of 29th Conference of Information Processing Society of Japan, pp. 1519–1522 and 1523–1524 (second half of 1984).
Salem-A Programming System for the Simulation of Systems Described by Partial Differential Equations, Morris et al, Fall Joint Computer Conference, 1986, pp. 353–357.
"IMSL-TWODEPEP: A Problem Solving System for Partial Differential Equations" (product description), ©1983.
"DEQSOL: A Numerical Simulation Language for Vector/Parallel Processors", Umetani et al. (12)/1987.
John R. Rice & Ronald F. Boisvert, Solving Elliptic Problems Using ELLPACK, pp. 1–47, 70–73, 139–149, 311–318, ©1985 by Springer-Verlag, New York Inc.

Primary Examiner—Parshotam S. Lall
Assistant Examiner—S. A. Melnick
Attorney, Agent, or Firm—Antonelli, Terry & Wands

[57] ABSTRACT

The partial differential equations inputted with respect to an unknown quantity A are processed according to the finite element method in which simultaneous first-order equations equivalent to the partial differential equations are obtained, and then a matrix equation equivalent to the simultaneous first-order equations, namely, $(k_{ij})(a_i)=(d_i)$ is processed to derive a coefficient $\{a_j\}$ so as to generate a program which calculates the unknown quantity A. For each group of a plurality of elements, the program calculates a contribution determined by the positions of the nodes associated with the elements with respect to a portion of matrix element group such as $k_{lm}$ and $k_{ll}$ and a portion of constant group such as $d_l$ and $d_m$ determined by the numbers assigned to a plurality of nodes contained in the group of a plurality of elements and then generates the final values of the matrix element group $\{k_{ij}\}$ and the constant $\{d_i\}$ from the contribution calculated for each group of a plurality of elements.

7 Claims, 22 Drawing Sheets

1

L1 = LINE(P1,P2), R(3, r1)

L2 = LINE(P2,P3), D(2)

L3 = ARC(P3,P4,P5), D(8)

L4 = LINE(P5,P1), D(2)

L5 = LINE(P3,P6), D(5)

L6 = SPLINE(P6,P9,P8,P7), R(10,r2)

L7 = LINE(P7,P5), D(5)

S1 = QUAD(P1,P2,P3,P5), A
S2 = QUAD(P5,P3,P6,P7), A $$\underline{2} \quad \begin{aligned} -\nabla \cdot (T\nabla A) + \vec{V} \cdot \nabla A + \beta * A + F &= 0 && \sim 53 \\ A &= A_0 && \text{AT } L1 + L6 + \cdots \sim 54 \\ \vec{n} \cdot (T\nabla A) &= \lambda * A + \mu && \text{AT } L2 + L4 \cdots \sim 55 \end{aligned}$$

FIG.7

DIMENSION TABLE

| | |
|---|---|
| NODE | ~910 |
| MESH | |
| BAND | |
| 3 | |
| L1BNUM | |
| L2BNUM | |

X TABLE (91)

| X1 | X2 | X3 | X4 | X5 | X6 | X7 | ----- |

Y TABLE (92)

| Y1 | Y2 | Y3 | Y4 | Y5 | Y6 | Y7 | ----- |

IADATA TABLE (93)

| | | | |
|---|---|---|---|
| E1 | N1 | N2 | N4 |
| E2 | N1 | N3 | N4 |
| E3 | N2 | N4 | N5 |

ICOEF TABLE (94)

| | | | | | | | |
|---|---|---|---|---|---|---|---|
| N1 | N1 | N2 | N3 | N4 | 0 | 0 | 0 |
| N2 | N1 | N2 | N4 | N5 | N6 | 0 | 0 |
| N3 | N1 | N3 | N4 | N5 | N16 | 0 | 0 |

L TABLE (97)

| N1 | N2 | N4 |
|---|---|---|
| N2 | N6 | N5 |
| N6 | N10 | N13 |

DISCRETIZATION TABLE

| 172 | 171 | 173 | 174 | 175 | 176 |
|---|---|---|---|---|---|
| + | $\dfrac{T_i+T_j+T_k}{3}\left(\dfrac{b_j}{2\Delta E}\dfrac{b_i}{2\Delta E}+\dfrac{c_j}{2\Delta E}\dfrac{c_i}{2\Delta E}\right)\|\Delta E\|$ | $\Omega$ | 1 | 0 | ~1711 |
| − | $\dfrac{\lambda_i+\lambda_j}{2}\dfrac{\|L_{ij}\|}{6}$ | $L_2$ | 1 | 1 | ~1712 |
| − | $\dfrac{\mu_i+\mu_j}{2}\dfrac{\|L_{ij}\|}{2}$ | $L_2$ | 0 | 0 | ~1713 |
| ⋮ | ⋮ | ⋮ | ⋮ | | |
| + | $\left(\dfrac{V_{xi}+V_{xj}+V_{xk}}{3}\dfrac{b_j}{2\Delta E}+\dfrac{V_{yi}+V_{yj}+V_{yk}}{3}\dfrac{c_j}{2\Delta E}\right)\dfrac{\|\Delta E\|}{3}$ | $\Omega$ | 1 | 0 | 1714 |
| + | $\dfrac{\beta_i+\beta_j+\beta_k}{3}\dfrac{\|\Delta E\|}{12}$ | $\Omega$ | 1 | 0 | 1715 |
| + | $\dfrac{F_i+F_j+F_k}{3}\dfrac{\|\Delta E\|}{3}$ | $\Omega$ | 0 | 0 | 1716 |

FIG. 9A

```
      DO 13 J=1, BAND
      DO 13 I=1, NODE
      RCOEF(I,J)=0.0
13    CONTINUE
      DO 14 I=1, NODE
      CONS(I)=0.0
14    CONTINUE
      DO 15 ENO=1, MESHNO
      DO 15 ICTR=1, 3
      P=IADATA(ENO, ICTR)
      Q=IADATA(ENO, MOD(ICTR,3)+1)
      R=IADATA(ENO, MOD(ICTR+1,3)+1)
      BP= Y(Q)-Y(R)
      CP= X(R)-X(Q)
      ARE=( X(Q)*Y(R)-X(R)*Y(Q)
     8    +X(P)*(Y(Q)-Y(R))
     8    +Y(P)*(X(R)-X(Q)))/2.0
      AARE=ABS(ARE)
      BQ=BP
      CQ=CP
      RCOEF(P,LISTV(P))=RCOEF(P,LISTV(P))+(+(((T(P)+T(Q)+T(R))/3*((BQ/2
     8*ARE))*((BP/(2*ARE))+(T(P)+T(Q)+T(R))/3*((CQ/(2*ARE))*((CP/(2*A
     8RE))))*AARE+(((VX(P)+VX(Q)+VX(R))/3)*((BQ/(2*ARE)))+((VY(P)+VY(Q
     8)+VY(R))/3)*((CQ/(2*ARE))))*AARE/3.0+(((BETA(P)+BETA(Q)+BETA(R))/
     83))*AARE/6.0
      BQ= Y(R)-Y(P)
      CQ= X(P)-X(R)
      BR= Y(P)-Y(Q)
      CR= X(Q)-X(P)
      CONS(P)=CONS(P)-(+((F(P)+F(Q)+F(R))/3-0.0)*AARE/3.0)
```

211, 212, 213, 214, 215, 216

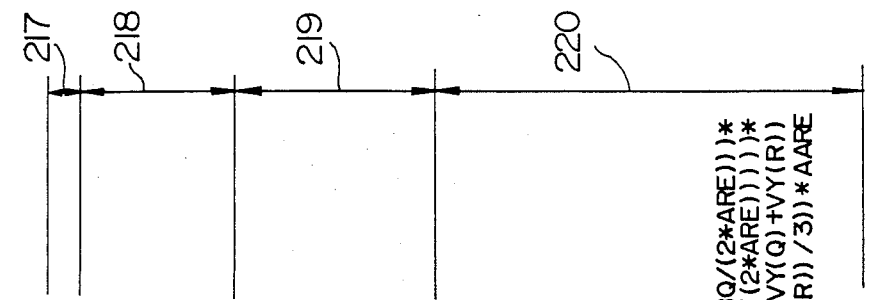

FIG. 9B

```
      DO 15 JCTR=1, 2
      Q=IADATA(ENO,MOD(ICTR+JCTR-1,3)+1)
      IF (JCTR.EQ.1) THEN
      R=IADATA(ENO,MOD(ICTR+JCTR,3)+1)
      ELSE
      R=IADATA(ENO,MOD(ICTR+JCTR-2,3)+1)
      ENDIF
      BP= Y(Q)-Y(R)
      CP= X(R)-X(Q)
      BQ= Y(R)-Y(P)
      CQ= X(P)-X(R)
      ARE=( X(Q)*Y(R)-X(R)*Y(Q)
     8       +X(P)*(Y(Q)-Y(R))
     8       +Y(P)*(X(R)-X(Q)))/2.0
      AARE=ABS(ARE)
      KCTR=1
      JIDX=0
 16   CONTINUE
      IF (Q.EQ.ICOEF(P,KCTR)) THEN
      JIDX=KCTR
      GO TO 17
      ELSE
      KCTR=KCTR+1
      GO TO 16
      ENDIF
 17   CONTINUE
      RCOEF(P,JIDX)=RCOEF(P,JIDX)+(+(((T(P)+T(Q)+T(R))/3*((BQ/(2*ARE)))*
     8((BP/(2*ARE))+(T(P)+T(Q)+T(R))/3*((CQ/(2*ARE)))*((CP/(2*ARE))))*
     8AARE+(((VX(P)+VX(Q)+VX(R))/3)*((BQ/(2*ARE))+((VY(P)+VY(Q)+VY(R))
     8/3)*((CQ/(2*ARE))))*AARE/3.0+(((BETA(P)+BETA(Q)+BETA(R))/3)*AARE
     8/12.0)
 15   CONTINUE ...
```

FIG. 9C

```
      DO 18 IL=1,L21
      DO 18 ICTR=1,2
      P=L2B(IL,ICTR)
      Q=L2B(IL,MOD(ICTR,2)+1)
      ALEN=SQRT((X(Q)-X(P))**2+(Y(Q)-Y(P))**2)
      RCOEF(P,LISTV(P))=RCOEF(P,LISTV(P))+(-((1.0*(LAMDA(P)+LAMDA(J))/2*
     8(T(P)+T(Q))/2)*ALEN/3.0)
      CONS(P)=CONS(P)-(+(-1.0*(MYU(P)+MYU(Q))/2*(T(P)+T(Q))/2)*ALEN/2.0)
      KCTR=1
      JIDX=0
   19 CONTINUE
      IF (Q.EQ.ICOEF(P,KCTR)) THEN
      JIDX=KCTR
      GO TO 20
      ELSE
      KCTR=KCTR+1
      GO TO 19
      ENDIF
   20 CONTINUE
      RCOEF(P,JIDX)=RCOEF(P,JIDX)+(-((1.0*(LAMDA(P)+LAMDA(Q))/2*(T(P)+T(
     8Q))/2)*ALEN/6.0)
   18 CONTINUE
```

FIG. 9D

```
       DO 27 ICTR=1,L10
       DO 27 JCTR=1,BAND
       I=L1(ICTR)
       J=ICOEF(I,JCTR)
       IF (I.NE.J) THEN
       RCOEF(I,JCTR)=0.0
       ELSE
       RCOEF(I,JCTR)=1.0
       ENDIF
       CONS(I)=1.0
  27   CONTINUE

EPS=1.0E-5
       CALL   ILUCR(NODE,WORK01,BAND,WORK02,ICOEF,RCOEF,WCOEF,A,CONS,WORK0
      83,WORK04,WORK05,WORK06,WORK07,WORK08,WORK09,WORK10,WORK11,WORK12,W
      8ORK13,EPS)
```

EQUATION TABLE 116 / 111

117

| − | $\nabla \cdot (T \nabla A)$ | 2 | ← 114 |
|---|---|---|---|
| + | $\vec{V} \cdot \nabla A$ | 1 | |
| + | $\beta * A$ | 0 | |
| + | F | −1 | |
| | | | |

FIG. 13

BOUNDARY CONDITION TABLE

112

115 — | $A = A_0$ AT L1+L6+ ··· |
| $m \cdot (T \nabla A) = \lambda * A + \mu$ AT L2+L4 ··· |
| |
| |

BOUNDARY SIDE TABLE  113

| L1 | $N_1$ | $N_2$ | $N_6$ | $N_{10}$ |
|---|---|---|---|---|
| L2 | | | | |
| L4 | | | | |
| L6 | | | | |
| ⋮ | | | | |

FIG. 15

INTEGRATION FORM EQUATION TABLE — 141

| | | |
|---|---|---|
| + | $\int_\Omega T \nabla A \cdot \nabla \varphi_i \, dx$ | |
| − | $\int_{L_2} (\lambda * A + \mu) \varphi_i \, dL$ | $L_2$ |
| − | $\int_{L_4} (\lambda * A + \mu) \varphi_i \, dL$ | $L_4$ |
| ⋮ | ⋮ | ⋮ |
| + | $\int_\Omega \vec{V} \cdot \nabla A \, \varphi_i \, dx$ | |
| + | $\int_\Omega \beta * A \, \varphi_i \, dx$ | |
| + | $\int_\Omega F \varphi_i \, dx$ | |

FIG. 16

INTEGRATION EVALUATION — 161

| | |
|---|---|
| $\int_E \nabla \varphi_j \cdot \nabla \varphi_i \, dx$ | $\left( \dfrac{b_j}{2\Delta E} \dfrac{b_i}{2\Delta E} + \dfrac{c_j}{2\Delta E} \dfrac{c_i}{2\Delta E} \right) \dfrac{|\Delta E|}{3}$ |
| $\int_E \varphi_j \cdot \varphi_i \, dx$ | IF $i \neq j$, $\dfrac{|\Delta E|}{12}$; IF $i = j$, $\dfrac{|\Delta E|}{6}$ |
| $\int_L \varphi_i \, dx$ | $\dfrac{|\Delta E|}{3}$ |
| $\int_{\delta\Omega \cap E} \varphi_j \varphi_i \, dL$ | IF $i \neq j$, $\dfrac{|\Delta E|}{2}$; IF $i = j$, $\dfrac{|L_{ij}|}{3}$ |
| $\int_{\delta\Omega \cap E} \varphi_i \, dL$ | $\dfrac{|L_{ij}|}{2}$   $|L_{ij}|$: DISTANCE BETWEEN NODES $N_i$ AND $N_j$ |

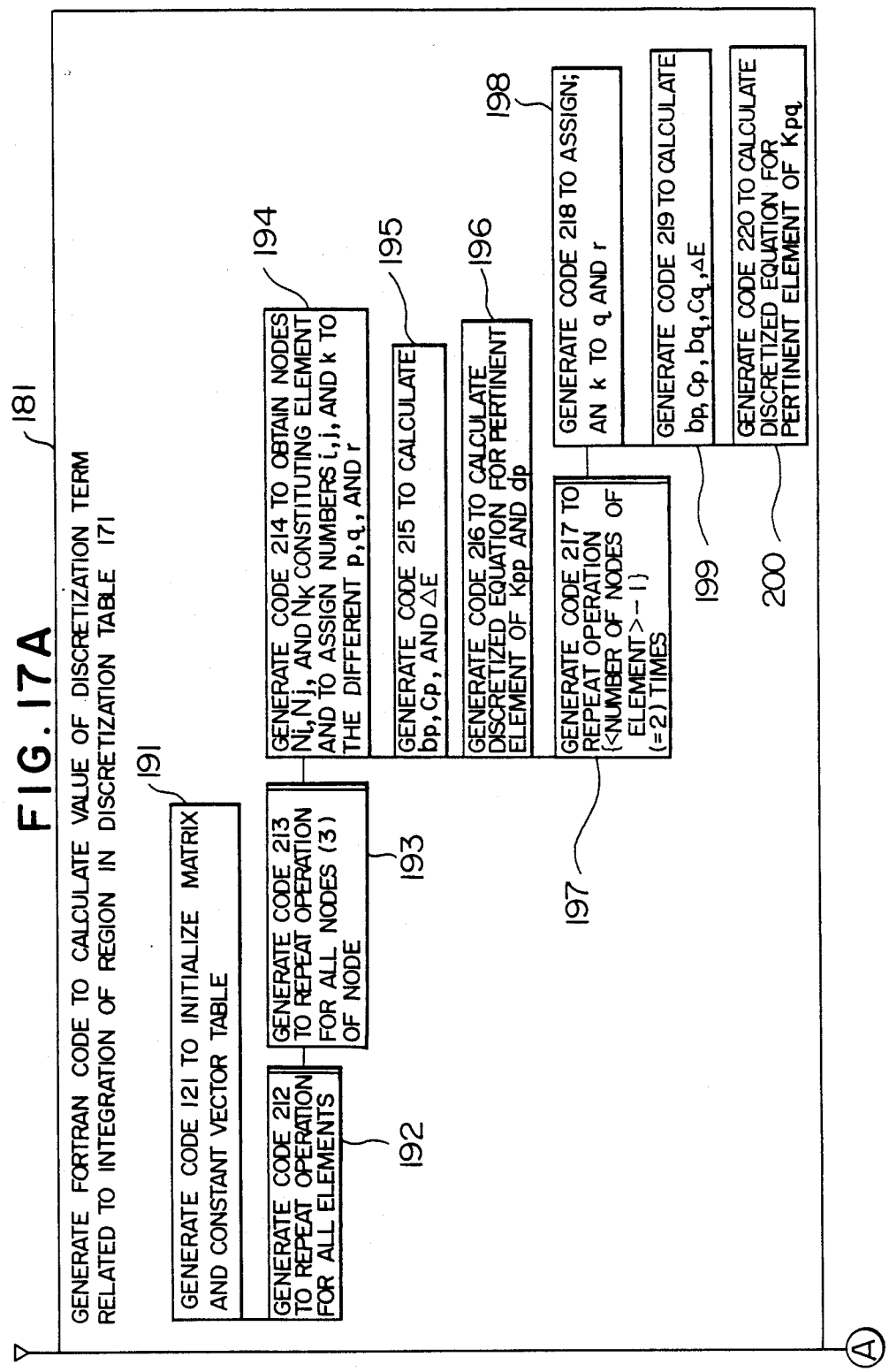

FIG.18A
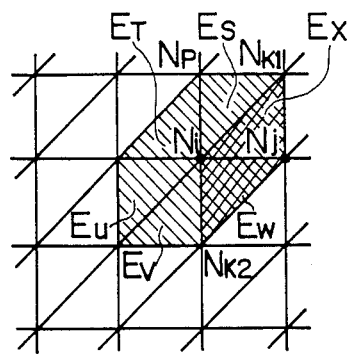
FIG.18B
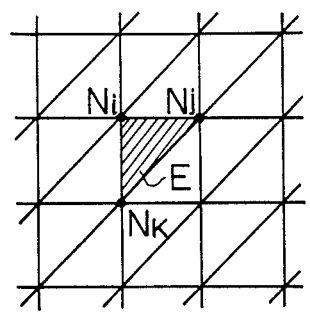
FIG.19
RCOEF TABLE 190    CONS TABLE 191

METHOD OF AUTOMATIC GENERATION OF A COMPUTER FOR NUMERICAL SIMULATION OF PHYSICAL PHENOMENON

BACKGROUND OF THE INVENTION

The present invention relates to a method for generating a numerical calculation program in which a physical phenomenon represented by a partial differential equation is converted into a numerical expression and is schematically displayed (namely, simulated), and in particular, a method for generating a numerical calculation program suitable for simulating a distribution of physical quantity in a space, for example, for a distribution of an electromagnetic field, a thermal conduction analysis, and a fluidal analysis.

Since a numerical calculation program varies depending on the shape of a region to be simulated, an equation (a partial differential equation, in general) representing a physical rule dominating a physical phenomenon to be simulated, a condition on a boundary of the region, and so forth; a considerable amount of human power is required to generate such a program. It is therefore desirable to automatically generate the program based on a simple input data.

Conventionally, program languages and programs for generating a program have been proposed, for example, by Morris, S. M. et al, "SALEM-A Programming System for the Simulation of Systems Described by Partial Differential Equations", Proc. Fall Joint Computer Conf., vol. 33, pp. 353–357 (1968); Cardenas, A. F. et al, "A Language for Partial Differential Equations", Comm. ACM, vol. 13, No. 3, pp. 184–191 (1970.3); Rice, J. R. et al, "ELLPACK Progress and Plans in Elliptic Problem Solvers", pp. 135–162, Academic Press (1981); and IMSL Inc., "TWODEPEP; A Finite Element Program", 3rd ed. (1982).

In the prior art techniques, the form of partial differential equations and the shape of the region to be simulated are limited. To overcome this difficulty, there have been published a program language called Differential Equation Solver Language and a program for generating a numerical simulation program by use of the programming language. For example, Transactions of 26th Conference of Information Processing Society of Japan, pp. 427–428, 429–430, and 431–432 describe a method for generating a program to achieve a numerical calculation based on the finite difference calculus for partial differential equations to be simulated, and Transactions of 29th Conference of Information Processing Society of Japan, pp. 1519–1522 and 1523–1524 outline a method for generating a program to effect a numerical calculation based on the finite element method for equations to be simulated.

Details about the latter are disclosed by Japanese Patent Unexamined Publication No. 60-140433 filed by the present assignee.

In a calculation according to the finite element method, a two- or three-dimensional region to be subjected to the numerical calculation is divided into small triangular regions called elements and first-degree equations approximately equivalent to partial differential equations are determined for vertices (called nodes) of each element, thereby obtaining approximate solutions for unknown quantities at the nodes.

According to the technique disclosed by Japanese Patent Unexamined Publication No. 60-140433, when a numerical calculation program is generated from the results of the region division, data indicating the linkage information between the nodes is generated for each node and the program is generated by use of the data, thereafter the program is executed. As a result, the amount of the data increases in proportion to the number of the nodes, and the increase of data is particularly remarkable in a case of a region to be subjected to a three-dimensional simulation. This leads to a problem in that a memory having a considerably great capacity is necessary.

The conventional apparatus disclosed by the articles referenced above, however, have not disclosed a technique for automatically dividing a region into elements when the total numbers of division specified by the high level language for the opposing sides of the region are different.

Moreover, among the forms of the objective partial differential equations, only particular forms have been instantiated, namely, a technique for automatically generating a program to effect a numerical calculation for equations which vary according to the simulation model has not been disclosed.

Furthermore, the disclosed examples are associated with only particular boundary conditions, that is, a method for incorporating an arbitrary boundary condition has not been disclosed.

SUMMARY OF THE INVENTION

It is therefore an object of the present invention to provide a method for automatically generating a numerical simulation program which is capable of achieving a numerical simulation according to the finite element method based on a reduced number of data items related to the elements.

Another object of the present invention is to provide a method for automatically generating a program which performs a numerical simulation according to the finite element method when an arbitrary region is specified to be divided.

Still another object of the present invention is to provide a method for automatically generating a program which effects a numerical simulation according to the finite element method for arbitrary partial differential equations.

To this end, according to the present invention, the partial differential equations inputted with respect to an unknown quantity A are processed according to the finite element method in which simultaneous first-order equations approximately equivalent to the partial differential equations are obtained, and then a matrix equation equivalent to the simultaneous first-order equations, namely, $(k_{ij})(a_i)=(d_i)$ is processed to derive a coefficient $\{a_j\}$ so as to generate a program which calculates the unknown quantity A. For each group of a plurality of elements, the program calculates a contribution determined by the positions of the nodes associated with the elements with respect to a portion of matrix element group such as $k_{lm}$ and $k_{lk}$ and a portion of constant group such as $d_l$ and $d_m$ determined by the numbers assigned to a plurality of nodes contained in the group of a plurality of elements and then generates the final values of the matrix element group $\{k_{ij}\}$ and the constant group $\{d_i\}$ from the contribution thus calculated for each group of a plurality of elements.

If data indicating the relationship between the elements and the nodes and the position of each node are known, this method enables to obtain the final values as described above, which does not require the conventially required data indicating for each node, other nodes which are connected to the node and a number of the element to which the above other nodes belong.

BRIEF DESCRIPTION OF THE DRAWINGS

The present invention will be apparent from the following detailed description taken in conjunction with the accompanying drawings in which:

FIG. 7 is a schematic diagram demonstrating the node.element data table group 7 generated by the region division processing of FIG. 1;

FIG. 8 is a schematic diagram showing an example of the discretization table 171 generated by the discretization of equation 5 of FIG. 1;

FIGS. 9A–9D are explanatory diagrams collectively illustrating a main section of a calculation Fortran program generated by the calculation program generation processing 6 of FIG. 1;

FIG. 12 is an explanatory diagram showing an equation table 111 generated by the equation discretization processing 5 of FIG. 1;

FIG. 13 is a schematic diagram depicting a boundary condition table 112 generated by the equation discretization processing 5 of FIG. 1;

FIG. 14 is an explanatory diagram showing a boundary side table 113 generated by the equation discretization processing 5 of FIG. 1;

FIG. 15 is a schematic diagram illustrating an integration form equation table 141 generated by the equation discretization processing 5 of FIG. 1;

FIG. 16 is an explanatory diagram illustrating an integration evaluation table 161 beforehand generated to be used by the equation discretization processing 5 cf FIG. 1;

FIGS. 17A–17C are schematic diagrams collectively depicting a general flowchart of the calculation program generation processing 6 of FIG. 1;

FIG. 18A is a schematic diagram illustrating elements related to the calculation of matrix elements $k_{ij}$ and constant terms $d_i$ associated with a node $N_i$;

FIG. 18B is a schematic diagram illustrating elements for which integration is necessary to obtain a plurality of matrix elements related to three nodes $N_i$, $N_j$, and $N_k$ is an element;

FIG. 19 is a schematic diagram illustrating tables 190–191 generated by the calculation Fortran program 8 generated by the calculation program generation processing 6 of FIG. 1 to store the matrix elements $\{K_{ij}\}$ and constants $\{d_i\}$;

DESCRIPTION OF THE PREFERRED EMBODIMENT

(1) Outline

Figure 1:
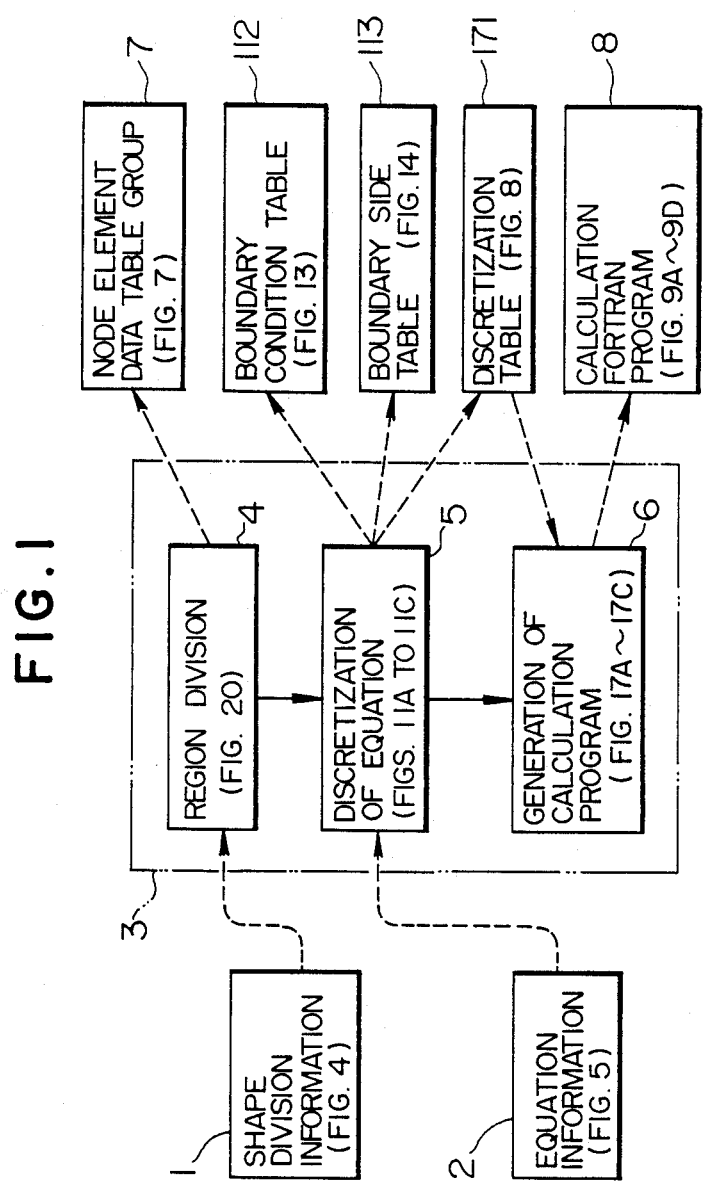
FIG. 1 is a schematic flowchart illustrating a program generation processing 3 of the present invention.
Figure 2:
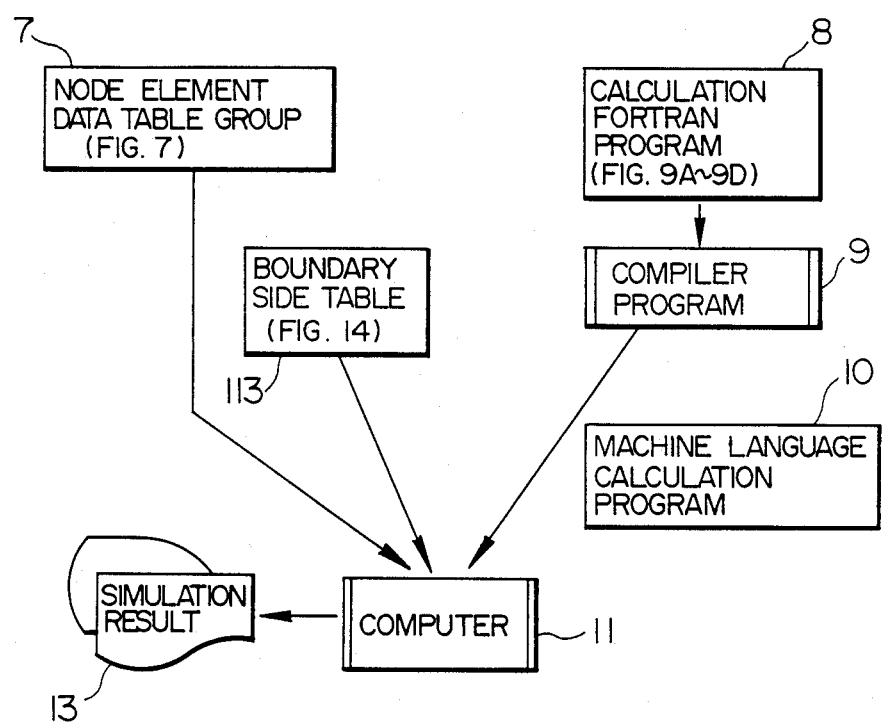
FIG. 2 is a schematic diagram illustrating an execution flow of a simulation accomplished by a program generated according to the present invention.

FIG. 1 is a flowchart of the numeric calculation program generation processing 3 according to the present invention. First, the operator inputs a shape.division information 1 indicating positions of boundaries or a shape of a region to be simulated and a procedure for dividing the region and an equation information representing partial differential equations dominating a physical phenomenon and initial values of variables in the equations or values on boundaries of the region (boundary conditions) to a computer (not shown) in which the program executing above-mentioned processing is installed in advance.

Figures 3, 4:
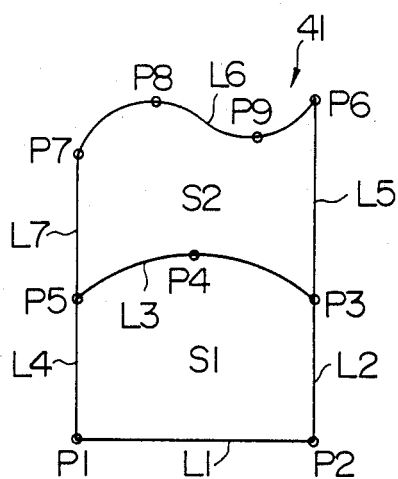
FIG. 3 is an explanatory diagram demonstrating an example of a region to be simulated.
FIG. 4 is an explanatory diagram illustrating an example of a shape division information 1 specifying the region of FIG. 3.

FIG. 3 is a schematic diagram showing an example of a region 41 to be simulated. The region 41 comprises subregions S1 and S2, which include sides $L_1$–$L_4$ and sides $L_3$ and $L_5$–$L_7$, respectively.

FIG. 4 is an explanatory diagram showing an example of the shape.division information 1 for the region 41. FIG. 3 will be described in detail later.

Figures 5, 6:
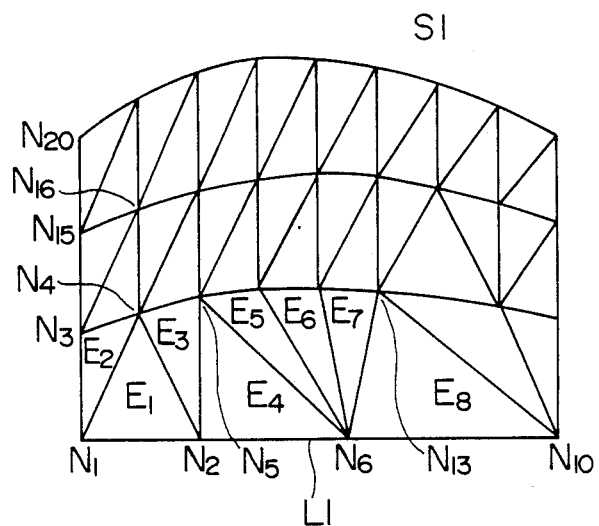
FIG. 5 is an explanatory diagram depicting an example of an equation information 2 used in the processing of FIG. 1.
FIG. 6 is an explanatory diagram depicting an example of the plurality of elements generated by the region division processing 4 of FIG. 1.

FIG. 5 is a schematic diagram depicting an example of the equation information 2 comprising an equation 53 and boundary conditions 54–55 associated with sides $L_1$, $L_6$, etc. and sides $L_2$, $L_4$, etc., respectively.

In FIG. 1, the program generation processing 3 executes the following three kinds of processing. A region division processing 4 divides the simulation objective region, based on the shape.division information 1 inputted by the operator, into triangular regions called elements and generates a node.element data table group 7 related to the vertices or nodes thereof and the elements.

The region division is effected for each subregion when the region 41 includes a plurality of subregions as shown in FIG. 3, however, the node.element data table group 7 is formed with respect to the entire region 41.

FIG. 6 is a schematic diagram depicting a result of a division conducted on the subregion S1 in which $E_i$ (i=1, 2, ...) and $N_j$ (j=1, 2, ...) indicate the element numbers and the node numbers, respectively.

FIG. 7 is a schematic diagram depicting a concrete example of the node.element data table group 7, which will be described in detail later.

Referring to FIG. 1, the equation discretization processing 5 accomplishes processing based on the inputted equation 53 and boundary conditions 54–55 to obtain a function comprising algebraic equations defining coefficients $K_{ij}$ and constants $d_i$ of simultaneous first-order equations related to values $a_i$ of the unknown quantity A at each node $N_i$ and then stores the function in the discretization table 171.

Based on the boundary condition information included in the equation information 2, the boundary condition table 112 and the boundary side table 113 are generated.

Using the generated node.element data table group 7, boundary condition table 112, boundary side table 113, and discretization table 171, the calculation program generation processing 6 generates a Fortran program code to determine the concrete values of $\{K_{ij}\}$ and $\{d_j\}$ and a Fortran code to call a subroutine program which solves the matrix equation related to $\{K_{ij}\}$, $\{a_i\}$, and $\{d_i\}$ based on the obtained values of $\{K_{ij}\}$ and $\{d_i\}$ (Fortran program 8 of FIGS. 9A-9D).

When a simulation is conducted by the Fortran program thus generated, the calculation program 8 coded in Fortran is translated into a machine language program 10 by a known compiler 9 and the resultant calculation program is loaded on the computer 11. On the other hand, the calculated node.element data table group 7, and boundary side table 113 are inputted as data to the computer 11, thereby obtaining the simulation result 13.

(2) Outline of finite element method

Prior to the detailed description of the program generation processing 3 as a central item of the present invention, a description will be given of the calculation method according to the finite element method which is the basis of the program generation processing 3.

The inputted equation 53 and boundary conditions 54-55 (FIG. 5) will be described before the procedure of the calculation method.

In this equation 53, $\nabla$ indicates a gradient differential operator $(\partial/\partial x, \partial/\partial y)$ and $\vec{V}$ is a vector function $(V_x, V_y)$, where T, $V_x$, $V_y$, $\beta$, and F are functions of space coordinates (x, y) in general. Moreover, "." denotes a scalar product between vectors and "*" designates a product between scalars. Reference numeral 54 is a constant boundary condition indicating that the value of the unknown quantity A must be a constant or fixed on the boundary sides $L_1$, $L_6$, etc. of a region $\Omega$. Reference numeral 55 is an unfixed boundary condition indicating that the expression 55 must hold on the boundary sides $L_2$, $L_4$, etc., where $\vec{n}$ is a unitary vector along the direction of the normal line on the boundary sides of the region and $\lambda$ and $\mu$ indicate functions of space coordinates (x, y) in general.

Figure 10:
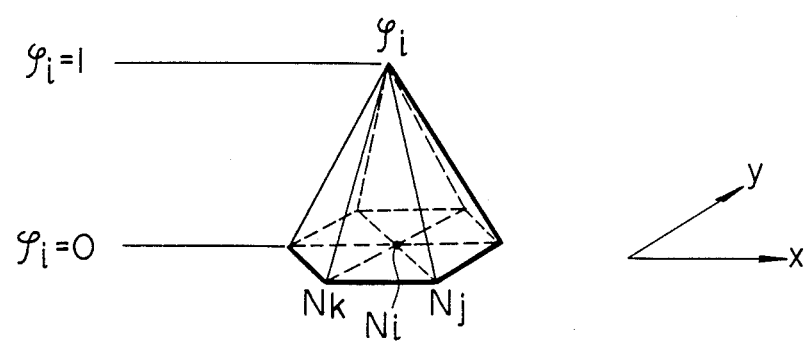
FIG. 10 is a schematic diagram showing an example of a basis function $\phi_i$ used in the program generation processing 3 of FIG. 1.

In the finite element method, the calculation is accomplished by use of a basis function defined on each node. FIG. 10 is a schematic diagram illustrating an example of a basis function $\phi_i$ defined on the i-th node $N_i$. The function $\phi_i$ is 1 on the i-th node $N_i$ and is 0 on a line linking the other adjacent nodes $N_j$, $N_k$, etc. Namely, the basis function $\phi_i$ is represented in a form of a tent which takes the value of height of a hexagonal cone established by connecting the i-th node $N_i$ to the adjacent nodes $N_j$, $N_k$, etc.

In the finite element method, the objective unknown quantity A is approximated by a linear combination of basis functions $\phi_j$ (j=1-N_T) as represented by the following expression (1). In place of the unknown quantity A, coefficients $\{a_j\}$ are derived as the values of the unknown quantity A at the nodes $\{N_j\}$. In the expression (1), NODE denotes the number of the nodes in the region $\Omega$ to be simulated.

$$A = \sum_j^{NODE} a_j \phi_j \tag{1}$$

To determine the coefficients $\{a_j\}$, the expression 53 (FIG. 5) is multiplied by $\phi_i$ and the resultant function is integrated in the simulation region $\Omega$ to be reduced to the following equation (2).

$$-\int_\Omega (\nabla \cdot (T\nabla A))\phi_i + \int_\Omega (\vec{V}\cdot \nabla A)\phi_i + \int_\Omega \beta A \phi_i + \int_\Omega F \phi_i = 0 \tag{2}$$

Here, the following autonomous relational expression (3) is used.

$$-\int_\Omega (\nabla (T\nabla A))\phi_i = \int_\Omega (T\nabla A)\cdot \nabla \phi_i - \int_{\partial \Omega} \vec{n}\cdot (T\nabla A)\phi_i \tag{3}$$

where $\partial \Omega$ indicates the boundary of the region $\Omega$. On the sides $L_2$, $L_4$, etc. (to be collectively referred to as a boundary $\partial \Omega_2$ hereinbelow), expression (4) holds as follows from the relationships of the equation 53 of FIG. 5.

$$-\int_\Omega (\nabla \cdot T\nabla A)\phi_i = \int_\Omega (T\nabla A)\cdot \nabla \phi_i - \int_{\partial \Omega_2} \lambda A \phi_i - \int_{\partial \Omega_2} \mu \phi_i \tag{4}$$

By substituting the equations (4) and (1), the following equation (5) results. The equation (5) holds when i indicates a node number of a node on the boundary $\partial \Omega_2$ or a node inside the region $\Omega$.

$$\sum_j \left( \int_\Omega (T\nabla \phi_j)\nabla \phi_i + \int_\Omega (\vec{V}\nabla \phi_j)\phi_i + \int_\Omega \beta \phi_j \phi_i - \int_{\partial \Omega_2} \lambda \phi_j \phi_i \right) a_j = - \int_\Omega F\phi_i + \int_{\partial \Omega_2} \mu \phi_i \tag{5}$$

On the other hand, expression (6) holds on the boundary sides $L_1$, $L_6$, etc. (to be collectively referred to as a boundary $\partial \Omega_1$ hereinbelow) based on the boundary condition 54 and the equation (1) as follows.

$$a_i = A_o \tag{6}$$

Using the equations (5) and (6), simultaneous first-order equations are obtained with respect to coefficients $a_j$. The equations can be represented as a matrix equation (7) as follows.

$$[K_{ij}][a_j] = [d_j] \tag{7}$$

where;

$$K_{ij} = \int_\Omega (T\nabla \phi_j)\nabla \phi_i + \int_\Omega (\vec{V}\cdot \nabla \phi_j)\phi_i + \int_\Omega \beta \phi_j \phi_i + \int_{\partial \Omega_2} \phi_j \phi_i \tag{8}$$

$$d_i = -\int_\Omega F\phi_i - \int_{\partial \Omega_2} \mu \phi_i \tag{9}$$

when i denotes a node number of a node on the boundary $\partial \Omega_2$ or of a node inside the region $\Omega$; and $$\left. \begin{array}{l} K_{ij} = 1 \\ K_{ij} = 0 \quad (j \neq i) \\ d_i = A_o \end{array} \right\} \tag{10}$$

when i denotes a node number of a node on the boundary $\partial \Omega_1$.

Consequently, solving the simultaneous first-order equations (7), the coefficients $\{a_j\}$ (j=1, 2, ... NODE) can be derived. The operation to form the simultaneous first-order equations (7) from the original equation 53 (FIG. 5) is called discretization.

According to the present invention, from the inputted equation 53 and boundary conditions 54-55 (FIG. 5), a Fortran program code is generated to calculate concrete values of $\{K_{ij}\}$ and $\{d_i\}$, which is characterized in that the code is so generated as to minimize the amount of data required to execute the generated code. Moreover, it is also characteristic that even if the inputted terms of the partial differential equations are not ordered according to the order of differentiation, the Fortran program code can also be generated. The present invention is further characterized in that the Fortran program code is generated according to an inputted specification of an arbitrary region division.

To calculate the values of $K_{ij}$ and $d_i$, the values of various integrations contained in the equation (8) must be calculated. Usually, this is accomplished by use of the following various relational expressions.

First, the first term on the right side of the equation (8) is approximated from the following equation (1) or (14).

$$\int_\Omega (T\nabla\phi_j) \cdot \nabla\phi_i \approx \begin{cases} \sum_k \left(\frac{T_i + T_j + T_k}{3}\right) \int_E \nabla\phi_j \cdot \nabla\phi_i \\ \quad \text{when the nodes } N_i \text{ and } N_j \\ \quad \text{belong to the same element } E, \\ 0 \quad \text{when the nodes } N_i \text{ and } N_j \text{ belong} \\ \quad \text{to different elements;} \end{cases} \quad (11)$$

where, E represents an element including the nodes $N_i$ and $N_j$ and k is a node number of a node other than those of the nodes $N_i$ and $N_j$ and belonging to the element E. $T_i$, $T_j$, and $T_k$ denote values of the function T at the nodes $N_i$, $N_j$, and $N_k$, respectively. In the following description, the same notation will be applied to the functions $\beta$, $\lambda$, and so forth. The integral of the equation (11) can be obtained from the following expression.

$$\int_E \nabla\phi_j \cdot \nabla\phi_i = \frac{b_j b_i + c_j c_i}{12|\Delta E|} \quad (12)$$

where, $$\begin{aligned} |\Delta E| &= \frac{1}{2} \begin{vmatrix} 1 & x_i & y_i \\ 1 & x_j & y_j \\ 1 & x_k & y_k \end{vmatrix} \\ b_j &= y_k - y_i, \quad b_i = y_j - y_k \\ c_j &= x_i - x_k, \quad c_i = x_k - x_j \end{aligned} \quad (13)$$

For $i = j$:

$$\int_\Omega (T\nabla\phi_i) \cdot \nabla\phi_i = \sum_{k,l} \frac{T_i + T_k + T_l}{3} \int_E (\nabla\phi_i)^2 \quad (14)$$

holds, where E is an element including the node $N_i$ and k and l represent node numbers other than that of the node $N_i$ in the element. Also in this case, the expressions (12), (13), etc. hold with respect to the integration of the expression (14) if i is substituted by j.

The second term on the right side of the equation (8) is derived from the following expression.

$$\int_\Omega (V \cdot \nabla\phi_j)\phi_i \, d\Omega = \int_\Omega \left(V_x \cdot \frac{\partial \phi_j}{\partial x}\right)\phi_i + \quad (15)$$

$$\int_\Omega \left(V_y \cdot \frac{\partial \phi_j}{\partial y}\right)\phi_i$$

$$\approx \begin{cases} \sum_k \frac{(V_{xi} + V_{xj} + V_{xk})b_j}{6|\Delta E|} \int_E \phi_i \\ \quad + \frac{(V_{yi} + V_{yj} + V_{yk})c_i}{6|\Delta E|} \int_E \phi_i \\ \quad \text{when } i \text{ and } j \text{ belong to the same} \\ \quad \text{element } E; \\ 0 \quad \text{when } i \text{ and } j \text{ belong to the} \\ \quad \text{different elements;} \end{cases} \quad (16)$$

where, $$\int_E \phi_i = |\Delta E|/3 \quad (17)$$

The expressions (16)–(17) can be considered to hold in either cases of $i = j$ and $i \neq j$.

The third term on the right side of the expression (8) can be obtained as follows.

$$\int_\Omega \beta\phi_j\phi_i \approx \begin{cases} \sum_k \frac{(\beta_i + \beta_j + \beta_k)}{3} \int_E \phi_j\phi_i \\ \quad \text{when } i \text{ and } j \text{ belong to the same element } E; \\ 0 \quad \text{when } i \text{ and } j \text{ belong to the different} \\ \quad \text{elements;} \end{cases} \quad (18)$$

where, $$\int_E \phi_j\phi_i = \begin{cases} \frac{|\Delta E|}{12} & (i \neq j) \\ \frac{|\Delta E|}{6} & (i = j) \end{cases} \quad (19)$$

The fourth term on the right side of the equation (8) is reduced to be as:

$$\int_{\partial\Omega_2} \lambda\phi_j\phi_i = \begin{cases} \frac{\lambda_i + \lambda_j}{2} \int_{\partial E} \phi_j\phi_i & \text{when } i \text{ and } j \text{ belong} \\ & \text{to the same} \\ & \text{element } E; \\ 0 & \text{when } i \text{ and } j \text{ belong} \\ & \text{to the different} \\ & \text{elements or} \\ & \text{one of } i \text{ and } j \\ & \text{is not existing} \\ & \text{on the boundary } \partial\Omega_2; \end{cases} \quad (20)$$

where $\partial E$ represents a side linking the nodes $N_i$ and $N_j$. Moreover, $$\int_{\partial E} \phi_j \phi_i = \begin{cases} \dfrac{|L_{ij}|}{6} & (i \neq j) \\ \dfrac{|L_{ik}|}{3} & (i = j, k \text{ is a node on the boundary } \partial\Omega_2 \text{ and belongs to the same element as } i) \end{cases} \quad (21)$$

where, $|L_{ij}|$ indicates distance between the nodes $L_i$ and $L_j$.

The first term on the right side of the equation (9) is expressed as:

$$\int_\Omega f \phi_i = \sum_{j,k} \dfrac{f_i + f_j + f_k}{3} \int_E \phi_i \quad (22)$$

where, $$\int_E \phi_i = |\Delta E|/3 \quad (23)$$

The second term on the right side of the equation (9) is represented as:

$$\int_{\partial\Omega_2} \mu \phi_i = \sum_j \dfrac{\mu_i + \mu_j}{2} \int_{\partial\Omega_2 \cap E} \phi_i \quad (24)$$

where, $$\int_{\partial\Omega_2 \cap E} \phi_i = |L_{ij}|/2 \quad (25)$$

As can be seen from the foregoing description, the integral terms in the expressions (8) or (9) can be represented, based on the expressions (11)–(25), as algebraic expressions by use of the positions of a plurality of related nodes and the function values at the nodes such as $T_i$, $V_{xi}$, $V_{yi}$, $\lambda_i$, $f_i$, and $\mu_i$ etc.

(3) Discretization of equation 5

In this processing, the integral expressions (8)–(9) defining $K_{ij}$ and $d_i$ of the matrix equation associated with the equation information 2 inputted are first determined, and then algebraic expressions defining $K_{ij}$ and $d_i$ are derived from the expressions (11)–(25).

Figure 11A:
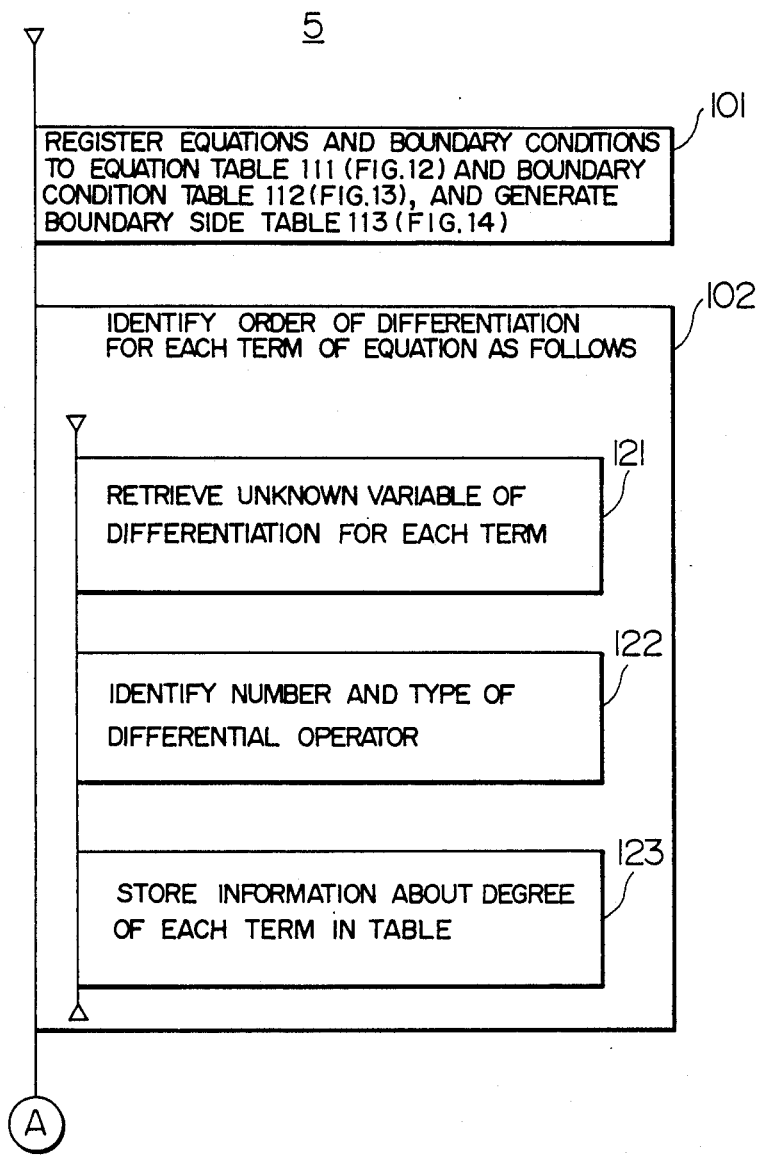
FIGS. 11A–11C are schematic diagrams illustrating a general flow of the equation discretization processing 5 of FIG. 1.
Figure 11B:
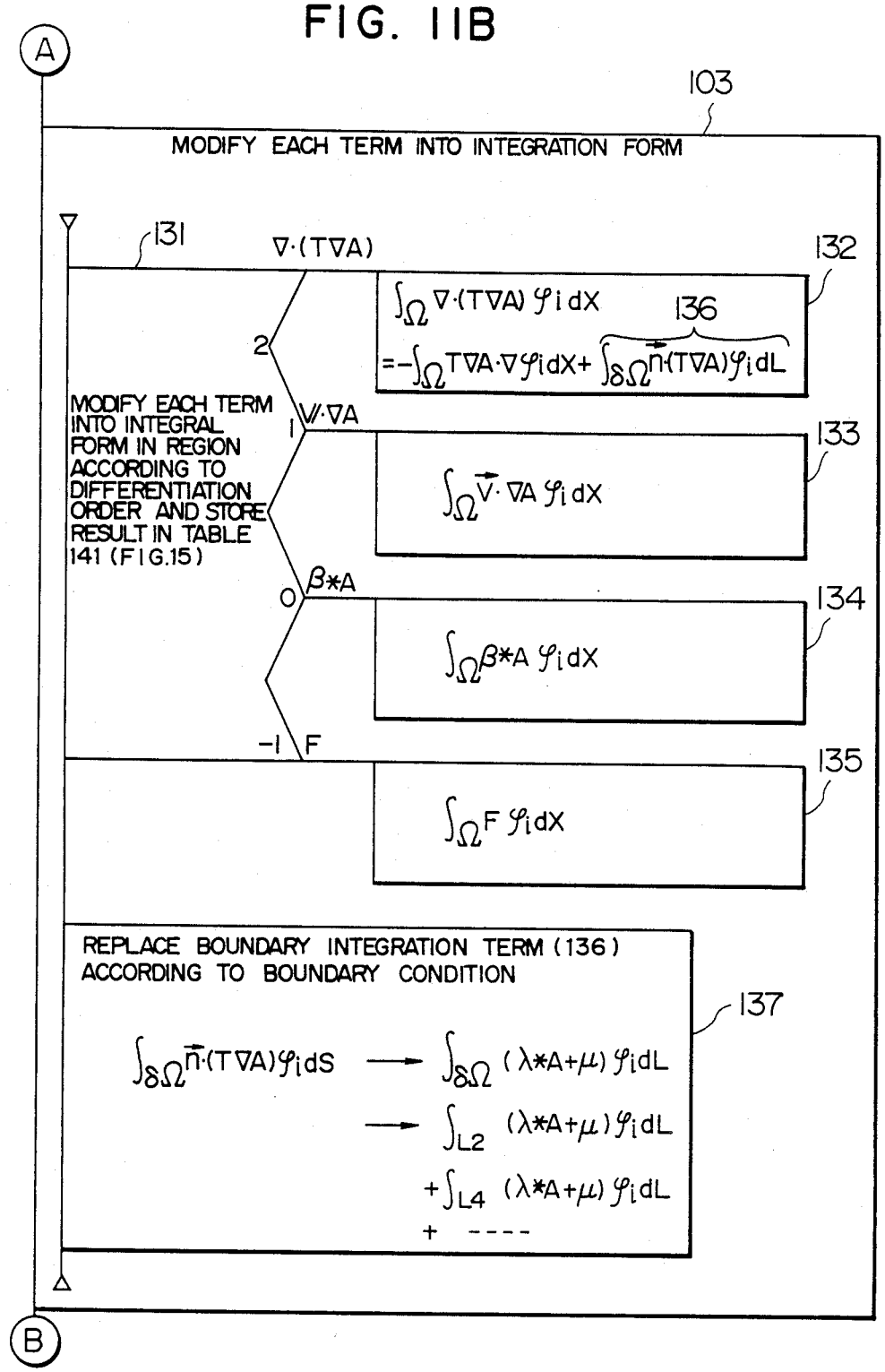
Figure 11C:
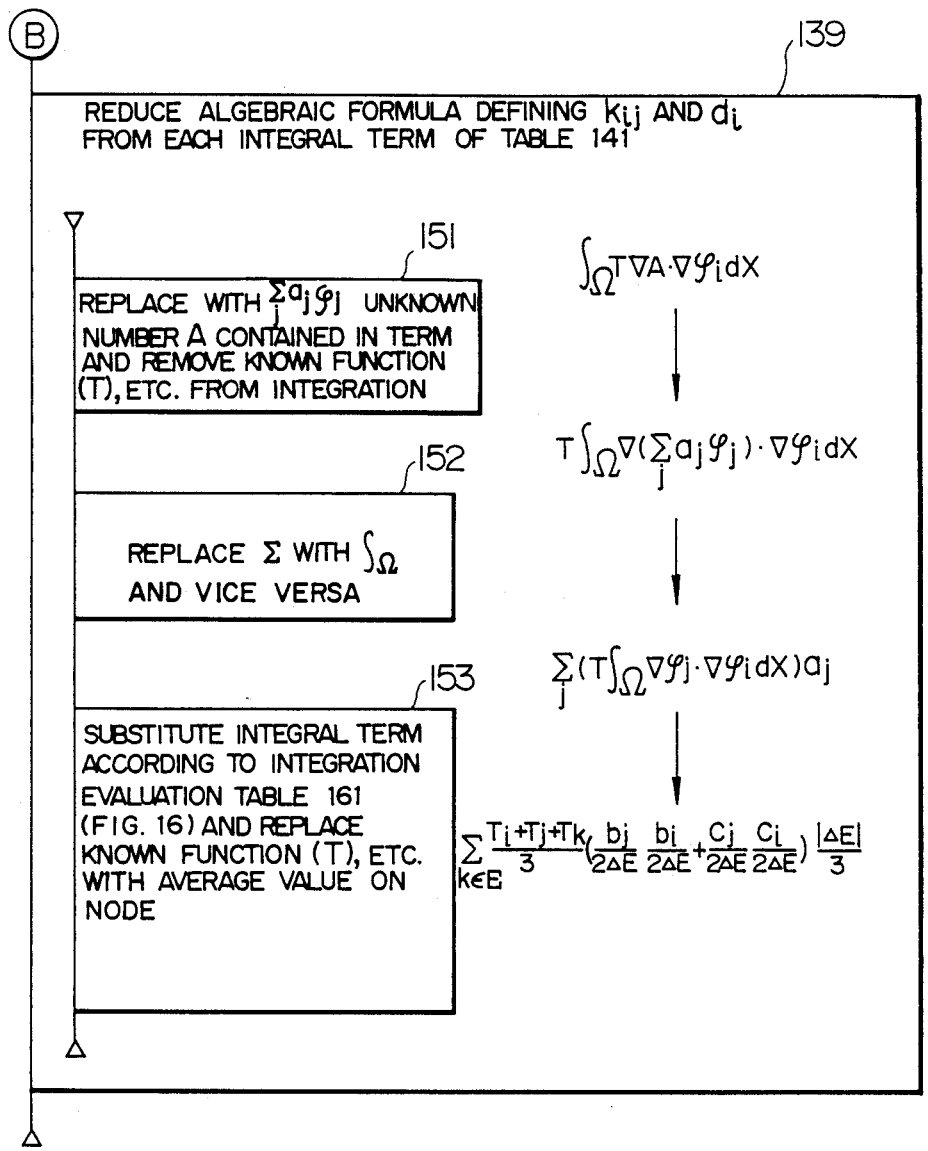

In this case, since the terms are not necessarily arranged in the sequence of the order of differentiation, the order of differentiation is determined in this processing, which is characteristic to the present invention. This will be described with reference to FIGS. 11A–11C which is a flowchart according to the Program Analysis Diagram (PAD). The flowcharts subsequent to FIGS. 11A–11C are also generated according to the PAD.

First, the inputted partial differential equation 53 and boundary conditions 54–55 (FIG. 5) are registered to the equation table 111 (FIG. 12) and the boundary condition table 112 (FIG. 13), respectively, and then the boundary side table 113 (FIG. 14) is generated (step 101). The equation table 111 comprises entries 117, 116 and 114 keeping the sign, content, and order of differentiation for each term of the differential equation 53. Separation of the terms can be easily determined by counting the number of addition arithmetic expressions and the number of parentheses contained in the equation. The order of differentiation of each term is stored in a processing step 102 (FIG. 11A) to be described later. The boundary condition table 112 keeps the inputted boundary conditions 54–55 according to the content of each boundary condition, namely, each boundary condition expression and the name of the boundary side on which the condition of the boundary condition expression is satisfied are stored. The boundary side table 113 (FIG. 14) keeps, for each node constituting each boundary side contained in the boundary condition expressions, the node number and the name assigned to the side. The node numbers are obtained from the L table 97 included in the node element data table group 7 (FIG. 7), which will be described in detail later.

Next, in step 102, the equations stored in the equation table 111 (FIG. 12) are checked to identify the order of differentiation for each term thereof. That is, in step 121, the equation table 111 is checked to retrieve an unknown variable A contained in each term. Step 122 then identifies the number and kinds of differential operators related to the unknown variable A. Step 123 sets the number of the differential operators as the order of differentiation to an area 114 of the equation table 111. For the term $\beta^*A$ proportional to the variable A and the term F not including the variable A, the order of differentiation is set to 0 and −1, respectively. That is, if the area 114 is set to a value equal to or greater than $\emptyset$, the pertinent term contains the variable A; otherwise, the term does not contain the variable A. Step 103 converts each term stored in the equation table 111 into the integral form. That is, the equation 53 (FIG. 5) is converted into the equation (4). First, step 131 multiplies each term by the basis function $\phi_i$ and converts the respective terms of the entry 116 into the integral form 132–135 according to the order of differentiation of each term set to the entry 114. In this case, for a term with the second order of differentiation such as $\nabla \cdot (T\nabla A)$, the integral form is translated, by use of the partial integral formula (3), into the integral form 132 constituted with the terms having the first order of differentiation. In this procedure, the boundary integral term 136 is derived. In step 137, $\bar{n} \cdot (T\nabla A)$ of the boundary integral term 136 is replaced with the item on the right side of the boundary condition equation stored in the boundary condition table 112 (FIG. 13), namely, the translation of the equation into the equation (4) is achieved. This operation is conducted for each different boundary condition and for each boundary edge satisfying the condition.

The translation result is stored in the integral form table 141 (FIG. 15), which contains the sign, content, and the related boundary side name for each term of the integral form equation. Step 139 derives a function comprising algebraic expressions defining $K_{ij}$ and $d_i$ from the integral terms stored in the integral form equation table 141. That is, step 151 substitutes the unknown variable A of each term in the integral form equation for a linear combination (1) of the basis function and removes the known quantity T from the integral. In step 152, the integral is replaced with the total $\Sigma$ with respect to the index j. Steps 151–152 effect a conversion of the equation (4) into the equation (5).

According to the present embodiment, algebraic expressions representing the results of execution of various integral terms such as $\int \nabla \phi_j \cdot \nabla \phi_i$, $\int \nabla \phi_i$, and $\int \phi_i$ are beforehand stored in the integration evaluation table 161 (FIG. 16). In step 153, as instantiated by the expressions (11) and (14), the known quantity (T) is replaced with an average $$\left( \frac{T_i + T_j + T_k}{3} \right)$$

of the values at the nodes $N_i$, $N_j$, and $N_k$ constituting the element E. Moreover, the number of the basis functions included in the result of the step 152 and the condition indicating whether or not the differential operator $\nabla$ is applied are identified. Based on the identification result, the integration evaluation table 161 is accessed to retrieve an execution result of the matched integration, and then the integral in the result of the step 152 is replaced with the algebraic expression representing the execution result.

However, for the integrals of which the results vary between $i=j$ and $i \neq j$ in the integration evaluation table, namely, for $\int_E \phi_j \phi_i dx$ and $\int_{\partial \Omega \cap E} \phi_j \phi_i dL$, the values are replaced with the evaluation equations for $i=j$ in the integration evaluation table 161. In any case of the integration, the value associated with $i \neq j$ is half the value associated with $i=j$. If it is desired to utilize the discretization table 171 (FIG. 8) or $i \neq j$, the values of the terms related to $\int_E \phi_j \phi_i dx$ and $\int_{\partial \Omega \cap E} \phi_j \phi_i dL$ need only be simply multiplied by 0.5. When the processing described above is effected for all integral terms in the integration equation table 141 (FIG. 15), the discretization table 171 (FIG. 8) is generated. Entry 172 keeps the sign of each term received from the integral form equation table 141, entry 173 stores an algebraic expression as a result of the execution of an integration, and entry 174 keeps an information indicating whether the discretized equation holds inside the region or on the boundary and indicating a boundary side of the boundary where equation holds on the boundary (this can be easily obtained from the integration range of each integral term). Entry 175 remains at 1 if the original integral form equation contains $\phi_i$, otherwise, the entry 175 remains $\emptyset$. Judgement to determine whether or not the equation contains $\phi_i$ can be easily made from the identification result of the step 153. That is, based on the equations (8) and (9), if a term is found to include $\phi_i$, the term is contained in the expression of $k_{ij}$; otherwise, the term is contained in the expression of $d_i$. As a result, from the information of the entry 175, it can be determined whether the discretized term contributes to $\{k_{ij}\}$ or $\{d_i\}$.

Entry 176 is used to indicate, for $i \neq j$, whether or not the equation in the entry 173 is to be multiplied by 0.5 before the equation is further processed.

(4) Node.element table group 7

The node.element table group 7 of FIG. 7 will be described, whereas the region division processing 4 which generates the node.element table group 7 will be described later.

In FIG. 7, the dimension table 910 keeps the number of the nodes NODE, the number of the elements or meshes MESH, the maximum value of the adjacent nodes adjacent to a node BAND, the number of the elements constituting each element 3, and the number of the elements each having two nodes on a side $L_i$ ($i=1, 2, \ldots$), namely, L1BNUM, L2BNUM, etc.

X table 91 keeps the x coordinate values $X_1$, $X_2$, etc. for all nodes, while Y table 92 keeps the y coordinate values $Y_1$, $Y_2$, etc. for all nodes. The x and y coordinate values are stored in the sequence of the node numbers.

IADATA table 93 stores, for each element, the node numbers of the nodes contained therein in the ascending sequence of the node numbers.

ICOEF table 94 keeps, for each node, the node numbers of the nodes adjacent thereto in the ascending node number order. If the number of the nodes currently adjacent to a node is less than the maximum number BAND, a number of 0's which number is equal to the difference therebetween is stored for each of the nodes.

L table 97 comprises tables 97-1 to 97-n each keeping, for each side $L_i$ ($i=1, 2, \ldots$) constituting a region, the node numbers of the nodes contained in each element which have two nodes on the side. For example, for a side $L_1$ of FIG. 6, the nodes belonging to $L_1$ includes $N_1$, $N_2$, $N_6$, and $N_{10}$, and the elements containing two nodes thereon are $E_1$, $E_4$, and $E_8$. In the table 97-1, the nodes $N_1$ and $N_2$ existing on the side $L_1$ are stored in the first and second columns and the node $N_4$ existing on other than $L_1$ is stored in the third column. That is, from the contents of the first and second columns of the table 97-1, the nodes existing on the side $L_1$ can be determined to include $N_1$, $N_2$, $N_6$, and $N_{10}$.

(5) Calculation program generation processing 6

In this processing, a Fortran program code (FIG. 9) is generated from the node.element data table group 7 (FIG. 7) generated by the region division processing 4 and the discretization table 171 (FIG. 8) generated by the equation discretization processing 5 so as to calculate the values of the coefficient matrix $\{k_{ij}\}$ and the constant vector $\{d_i\}$ constituting the matrix equation (7).

The basic concept for generating the Fortran code is as follows. The coefficient matrix $\{k_{ij}\}$ and the constant vector $\{d_i\}$ are represented by the expressions (8) and (9) when the node $N_i$ does not exist on the boundary $\partial \Omega_1$, and the expressions (8) and (9) are converted into algebraic expressions by evaluating the integral terms, and the resultant algebraic expressions are stored in the discretization table 171 in advance. The boundary integration terms $\int_{\partial \Omega_2} \lambda \phi_2 \phi_l$ and $\int_{\partial \Omega_2} \mu \phi_i$ in the expressions (8) and (9) are to be integrated on the boundary $\partial \Omega_2$; consequently, if the node $N_i$ does not exist on the boundary $\partial \Omega_2$, the results become $\emptyset$. That is, to determine $\{k_{ij}\}$ and $\{d_i\}$ corresponding to a node existing on $\partial \Omega_1$, the calculation need only be effected for the values of the discretized equations (associated with the regional integration terms) which hold inside $\Omega_2$ and which are stored in the discretization table 171 if the node $N_i$ exists inside the region $\Omega_2$. If the node $N_i$ exists on $\partial \Omega_2$, in addition to the discretized equations which hold inside the region and which are stored in the discretization table 171, the discretized equations (associated with the boundary integration terms) which hold on the boundary side region including the $N_i$ need only be calculated.

Whether a discretized term is used in the calculation of $\{k_{ij}\}$ or $\{d_i\}$ can be determined by referring to the information kept in the entry 175 as described above.

On the other hand, when the $N_i$ exists on $\partial \Omega_1$, the values of $\{k_{ij}\}$ and $\{d_i\}$ are determined from the equation (10). In this case therefore, the discretization table need not be used, and the determination of the values of $\{k_{ij}\}$ and $\{d_i\}$ can be effected independent of the node not existing on $\partial \Omega_1$.

A description will be given of a case where the discretized equations which hold inside the region $\Omega_2$ are evaluated.

To calculate the values of the discretized equations which hold inside the region is identical to achieving the regional integration equivalent thereto; consequently, the calculation of the values of the discretized equations can be conducted by calculating the value of the discretized equation for each element contained in the integration region and by adding the resultant values.

FIG. 18A shows a region in which the values of the discretized equations are calculated. To obtain the values of $k_{ii}$ and $d_i$, the values of the discretized equations are calculated on the elements $E_s$–$E_x$ including the nodes $N_i$ and the obtained values are added to each other; whereas to calculate the values of $k_{ij}$ ($i \neq j$), the values of the discretized equations are calculated on two elements $E_w$ and $E_x$ including the nodes $N_i$ and $N_j$ and the resultant values are added to each other.

Element E (comprising the nodes $N_i$, $N_j$, and $N_k$) which is included in the integration region for obtaining the values of nine matrix elements $k_{ii}$, $k_{ij}$, $k_{ik}$, $k_{ji}$, $k_{jj}$, $k_{jk}$, $k_{ki}$, $k_{kj}$, and $k_{kk}$ and three constant vector components $d_i$, $d_j$, and $d_k$ as shown in FIG. 18B is selected; then, the calculation of the discretized equations associated with the contribution from the element E to $k_{ii}$–$k_{jj}$ and $d_i$–$d_k$ is effected at a time. Processing for all elements, can be considered to be identical to calculating the values of the discretized equations for obtaining the values of all coefficient matrices $\{k_{ij}\}$ and all constant vectors $\{d_i\}$.

The calculation of the values of the discretized equations which hold on the boundary side region can also be accomplished in the same fashion.

Based on the method described above, the Fortran code for achieving the procedure to determine $\{k_{ij}\}$ and $\{d_i\}$ can be generated. In this processing, the calculation can be conducted for each element by use of the element table 93 indicating the nodes included in the element and the x and y coordinate tables 91–92.

Conventionally, the final values of $k_{ii}$, $k_{il}$–$k_{iNODE}$, and $d_i$ are calculated for each node by use of the data indicating, for each node other nodes which are connected to the node and a number of the element to which the above other nodes belong, and hence the amount of the data is considerably increased, however, the data associated with this processing is unnecessitated by the present invention.

Figure 17B:
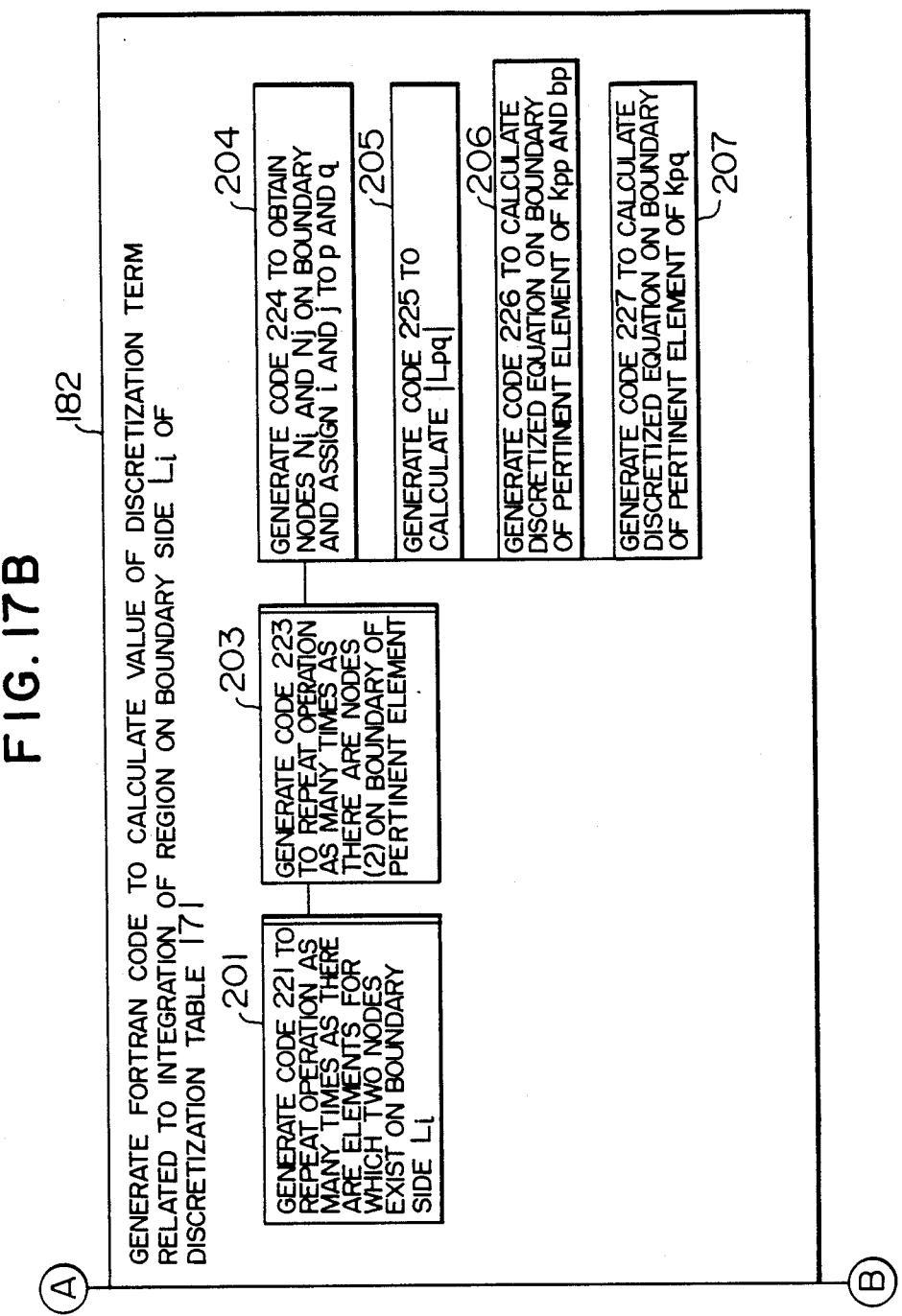
Figure 17C:
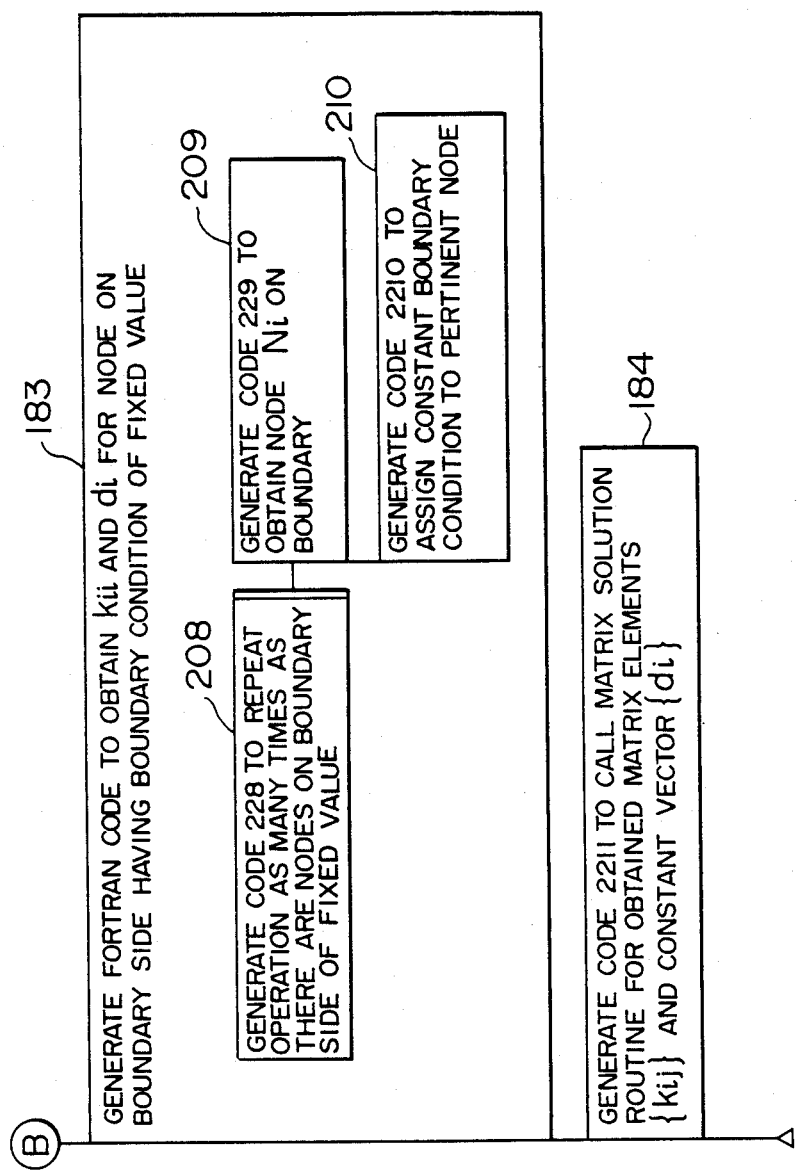

The following paragraphs will describe the flowchart of FIGS. 17A–17C. Step 182 generates a program code in which the entry 174 (see FIG. 8) is searched in the discretization table 171 to find out a plurality of discretized equations related to the regional integration, and then the value of each discretized equation thus obtained is calculated for all nodes of all elements, thereby calculating a portion of the values of $\{k_{ij}\}$ or $\{d_i\}$, the portion being determined depending on the regional integration terms.

Consequently, when the program codes generated by the processing steps 181 and 182 are executed, the final values of the matrix elements $\{k_{ij}\}$ and the constant terms $\{d_i\}$ can be derived for the nodes inside the region to be simulated and the nodes on the boundary $\partial\Omega_2$ with variable values (sides $L_2$, $L_4$, etc. in the case of FIG. 5).

Step 182 is a section where the matrix elements $\{k_{ij}\}$ and the content terms $\{d_i\}$ determined according to the node numbers of the nodes on the boundary $\partial\Omega_1$ with fixed values (sides $L_1$, $L_6$, etc. in the case of FIG. 5) are obtained from the equation (10).

In the steps 181 and 182 of the embodiment, based on the positions of all nodes including the nodes on the boundary $\partial\Omega_1$, the values of the discretized equations related to the regional integration or the values of the discretized equations related to the boundary integration are first calculated, and then the matrix elements $k_{ij}$ and $d_i$ related to the nodes on the boundary $\partial\Omega_1$ with fixed values are replaced with the values obtained by the step 182. Finally, step 184 generates a code for calling a matrix solution Fortran code routine (not shown) beforehand provided which derives $\{a_j\}$ from the equation (1) based on the $\{k_{ij}\}$ and $\{d_i\}$ thus determined. A description will be given of the details about the respective processing in conjunction with the example of the code generated as shown in FIGS. 9A–9D.

The program to be generated here first reserves the RCOEF table 190 and CONS table 191 (FIG. 19) to store the calculated values of $\{k_{ij}\}$ and $\{d_i\}$ in the memory (not shown) of the computer (not shown) and then conducts the calculation of the values of $\{k_{ij}\}$ and $\{d_i\}$.

In FIGS. 9A–9D, RCOEF (p, q) and CONS (l) are codes for referencing the entries for $k_{pq}$ and $d_l$ in the RCOEF table 190 and the CONS table 191, respectively. Similarly, X(p), Y(p), IADATA (p, q), and ICOEF (p, q) are codes for referencing the X table 91, the Y table 92, IADATA 93, and the ICOEF table 94 of FIG. 9.

According to this processing method, an element E (comprising the nodes $N_i$, $N_j$, and $N_k$) is selected so as to effect the calculation at a time for determining the values of the discretized equations associated with nine coefficient matrix components $k_{ii}$, $k_{jk}$, $k_{ik}$, $k_{ji}$, $k_{jj}$, $k_{jk}$, $k_{ki}$, $k_{kj}$ and $k_{kk}$ and three constant vector components $d_i$, $d_j$, and $d_k$ on the element E and the values are added to the respective coefficient matrix elements and the constant vector components. However, if all such codes generating the discretized equations of the 12 components are generated, the program becomes redundant. To overcome this difficulty, p, q, and r are introduced to assign i, j, and k in the different fashions, respectively; consequently, only the calculation codes associated with $k_{pp}$, $k_{pq}$, and $d_p$ are generated, and the calculation is conducted for the 12 components by sequentially changing i, j, and k to be assigned to p, q, and r. Namely, p indicates one of i, j, and k; q indicates one of i, j, and k and is different from the item assigned to p; and r indicates one of i, j, and k and is different from those items assigned to p and q. Assignment of p, q, and r and a concrete example thereof will be described in the following explanation about the code generation processing hereinbelow.

First of all, step 191 (FIG. 17A) generates a code 211 (FIG. 9A) for initializing the RCOEF table 190 and the CONS table 191. Steps 192–200 generate a code in which for each element the discretized equations corresponding to the regional integration of the coefficient matrix components $k_{ii}$, $k_{ij}$, $k_{ik}$, $k_{ji}$, $k_{jj}$, $k_{jk}$, $k_{ki}$, $k_{kj}$, and $k_{kk}$ and the constant vector components $d_i$, $d_j$, and $d_k$ of the element (to be represented as E comprising the nodes $N_i$, $N_j$, and $N_k$) are calculated, and then the obtained values are added to the respective areas allocated to the respective components in the RCOEF table 190 and the CONS table 191 as shown in FIG. 19. Step 192 generates a code 212 as a DO loop which repeats the execution of the code generated by the steps 193–200 as many times as there are elements. Step 193 generates a code 213 as a DO loop which repeatedly executes the code generated by the steps 194–200 as many times as there are nodes of the element (i.e., three times). Step 194 generates a code 214 which obtains the nodes constituting each element from the IADATA table 93 and assigns the node numbers thereof to the p, q, and r described above. If the component nodes are $N_i$, $N_j$, and $N_k$ and the node numbers thereof are i, j, and k, then i, j, and k are assigned to p, q, and r, for example. The DO loop generated by the step 194 has a function which changes the node number to be assigned to p among the p, q, and r as i, j, and k. Step 195 generates a code which calculates, from the expression (13), $b_p$, $c_p$, and $\Delta E$ based on the information stored in the x coordinate table 91 and the y coordinate table 92. Here, $b_p$, $c_p$, and $\Delta E$ are obtained by replacing i with p, j with q, and k with r. Step 196 generates a code in which, based on the added result of the equation information of the entry 173 associated with the terms 1711, 1714, and 1715 for which the entry 174 of the discretization table 171 contains $\Omega$ (indicating the discretized equations which hold inside the region $\Omega$) and for which the entry 175 contains 1 (indicating the discretized terms contributive to the matrix elements $\{k_{ij}\}$), the discretized equations associated with the regional integration terms contributive to the matrix elements $\{k_{ij}\}$ in each element are calculated and the resultant values are added to the entry $k_{pp}$ of the RCOEF table 190. The step 196 further generates a code in which, based on the equation information of the entry 173 associated with the term 1716 for which the entry 174 of the discretization table 171 contains $\Omega$ and for which the entry 175 contains $\emptyset$ (indicating the discretized equations contributive to the constant vectors $\{d_i\}$), the discritized equations corresponding to the regional integration terms contributive to the constant vectors $\{d_i\}$ in each element are calculated and the resultant values are added to $d_p$ of the CONS table 191 (code 216). Since the node number assigned to p by the DO loop generated by the step 194 changes as i, j, and k in this order, the values of the discretized equations associated with the regional integration of $k_{ii}$, $k_{jj}$, $k_{kk}$, $d_i$, $d_j$, and $d_k$ in the element E are calculated by the step 196, and as a result, the values are added to the respective areas of the components as shown in FIG. 19. Step 197 generates a code 217 as a DO loop which repeals an operation as many times as indicated by <number of the nodes of the element> −1 (namely, two times). Step 198 generates a code 218 which, without changing the node number assigned to p, assigns the different node numbers to q and r. For example, if i has been assigned to p, j and k are assigned to q and r, respectively, or k and j are assigned thereto. The DO loop generated by the step 197 is used to change the node numbers assigned to q and r among the p, q, and r.

Step 199 generates, based on the equation (13), $b_p$, $c_p$, $b_q$, $c_q$, and $\Delta E$ from the information stored in the X table 91 and the Y table 92. Like step 196, step 200 generates a code 220 in which, based on the discretization table 171, the calculation of the discretized equations associated with the regional integration contributive to the matrix elements $\{k_{ij}\}$ of each element is conducted and then the resultant values are added to the entry $k_{pq}$ in the RCOEF table 190. Since the DO loop generated by the step 193 changes the node numbers assigned to q and r; for example, if i has been assigned to p, the discretized equations associated with the regional integration of $k_{ij}$ and $k_{ik}$ of the element E are calculated and the obtained values are added to the respective entries of $k_{ij}$ and $k_{ik}$ shown in FIG. 19. If j has been assigned to p, the discretized equations related to $k_{ji}$ and $k_{jk}$ are calculated; whereas, if k has been assigned to p, the discretized equations associated with $k_{ki}$ and $k_{kj}$ are calculated.

For each boundary side having a boundary condition with a variable value, a code (not shown) is generated to execute the processing of the steps 201-207. Step 201 generates a code 221 as a DO loop for repeating an operation as many times as there exist elements each having two nodes on each side. Step 203 generates a code 223 as a DO loop which repeats an operation as many times as there exist nodes of the pertinent element (i.e., two times). Step 204 generates a code 224 which obtains the nodes of each element on the boundary by use of the boundary side table 97 and assigns the node numbers of the obtained nodes to p and q. If the nodes on the boundary are $N_i$ and $N_j$ and the node numbers thereof are i and j; i and j or j and i are assigned to p and q, respectively. The DO loop generated by the step 203 is used to change the node numbers assigned to p and q. Step 205 generates a code which calculates length of a line segment $L_{pq}$ between two nodes having the node numbers p and q. Step 206 generates a code in which, if the pertinent boundary side is $L_2$, based on the equation information of the entry 173 related to the item 1712 for which the entry 174 is $L_2$ and the entry 175 is 1 in the discretization table 171, the calculation of the discretized equations associated with the boundary integration terms contributive to the matrix elements $\{k_{ij}\}$ of a line segment (to be referred to as a boundary line segment herebelow) comprising two nodes on the boundary related to the element is effected and then the obtained values are added to the entry allocated to $k_{pp}$ in the RCOEF table 190; the step 206 further generates a code in which, based on the equation information of the entry 173 related to the item 1713 for which the entries 174 and 175 include $L_2$ and $\emptyset$, respectively in the discretization table 171, the calculation of the discretized equations associated with the boundary integration terms contributive to the constant vector $d_i$ in the boundary line segment is conducted and then the obtained values are added to the entry $d_p$ in the CONS table 191 (code 226). Like step 206, step 207 generates a code 227 in which, based on the discretization table 171, the calculation of the discretized equations associated with the boundary integration terms contributive to the matrix elements $\{k_{ij}\}$ of the boundary line segment is achieved and the obtained values are added to the entry of $k_{pq}$ in the RCOEF table 190. The steps 201-207 generate the codes only for the boundary regions for which the boundary conditions with variable values are defined as described above. Since the information indicating the boundary conditions and the regions associated therewith is kept in the field 174 of the discretization table 171, the codes are so generated as to reference the information.

Steps 208, 209, and 2010 in step 183 generate codes 228, 229, and 2210, respectively which set the boundary conditions represented by the equation (10) to the nodes on the boundary $\partial\Omega_1$ with fixed values.

To determine whether a side is on a fixed-value boundary or not, the information stored in the boundary condition table 112 (FIG. 13) need only be referenced, and the number of the nodes and the node numbers on the boundary are kept in the side table 97 (FIG. 7). Finally, the step 184 generates a code 2211 in which, to obtain $\{a_j\}$ based on the RCOEF table 190 and CONS table 191, a matrix solution routine prepared by the system is called. The values of $\{a_j\}$ are thus obtained, which completes the generation of the codes.

Among the calculation program generation flow, the steps 196, 1910, 206, and 207 excepting the integral calculation code generation are constituted with codes of the fixed structure, namely, these codes are independent of the types of expressions and boundary conditions. Consequently, the code generation does not require any special idea. The integral calculation codes are so generated as to replace the equation information kept in the discretization table 171 (FIG. 8) with the corresponding Fortran designations and symbols.

The operation flow of the program generation processing 3 has been described.

(6) Region division processing 4

Prior to this processing, the shape division information 1 will be described.

FIG. 5 shows a concrete example of the shape division information 1.

This is an example of the shape.division information 1 in a case where a region 41 comprising a subregion S1 defined by points $P_1, P_2, P_3, P_4, P_5$ and a subregion S2 defined by points $P_5, P_4, P_3, P_6, P_9, P_8$, and $P_7$ in FIG. 3 is set as an object of the simulation. The information includes a group of program statements defining the shapes of the areas and a group of program statements dividing the areas into elements. In the first program statement $L_1 = LINE\ (P_1, P_2), R(3, r_1), LINE\ (P_1, P_2)$ defines a line segment $L_1$ having two end points $P_1$ and $P_2$, whereas $R\ (3, r_1)$ indicates to divide the line segment into three partitions with a common ratio $r_1.L_2 = LINE\ (P_2, P_3), D(2)$ means that a line segment $L_2$ having two end points $P_2$ and $P_3$ is to be divided into two equal parts. ARC in $L_3$ indicates an arc to be defined, whereas SPLINE in $L_6$ denotes a spline curve. $L_1$ to $L_7$ are related to the boundary sides necessary to define the areas S1 and S2, which are to be automatically divided into elements. For example, a statement $S1 = QUAD\ (P_1, P_2, P_3, P_5)$, A indicates that an automatic region division is to be conducted on a region enclosed with the sides $L_1-L_4$ defined by the points $P_1, P_2, P_3$, and $P_5$ in advance.

Figure 20:
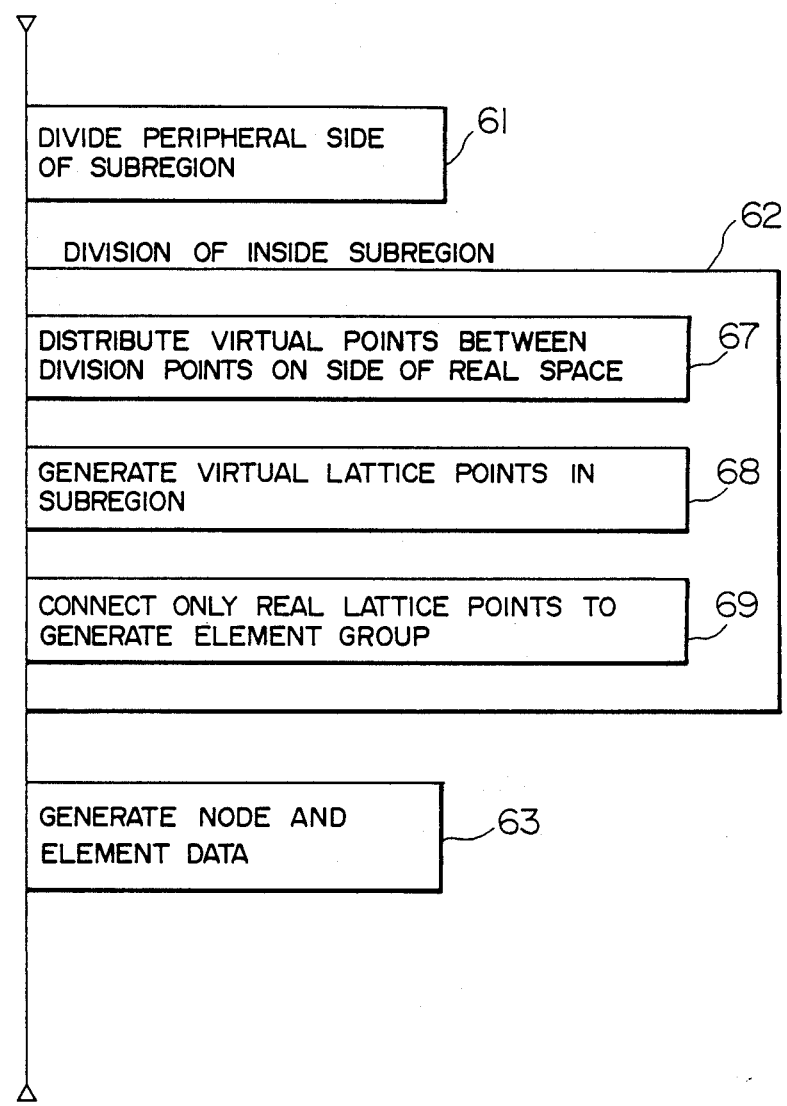
FIG. 20 is an explanatory diagram showing a general flowchart of the region division processing 4 of FIG. 1.

Next, the content of the region division processing 4 will be described with reference to FIG. 20.

First, division of the boundary sides $L_1-L_7$ of the subregions S1 and S2 (FIG. 3) is accomplished according to the shape.division information 1 (FIG. 4; step 61). Namely, the line segments of the boundary sides are divided into equal parts or according to the equal ratio, thereby determining the nodes on the sides.

Subsequently, the inside areas of the subregions S1 and S2 are divided into elements according to the division of the boundary sides (step 62).

Figure 21:
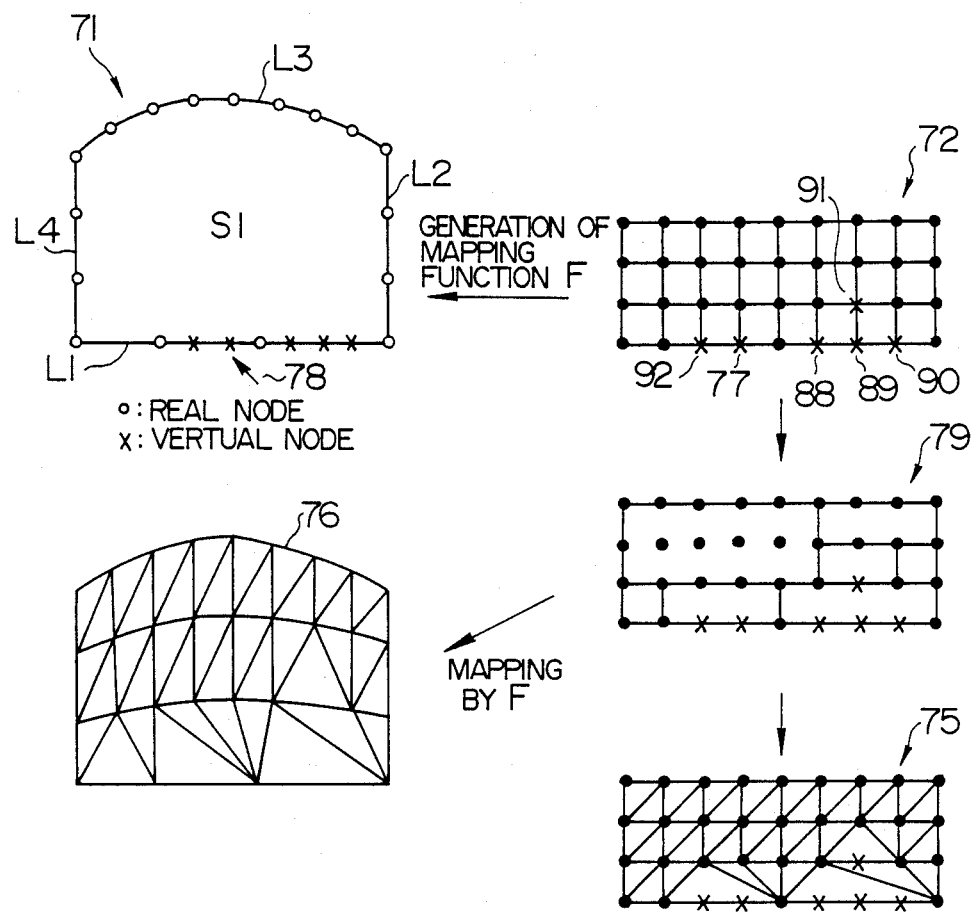
FIG. 21 is a schematic diagram for explaining the region division processing 4 of FIG. 1.

The processing flow of the automatic division will be described with reference to FIG. 21. In this diagram, reference numeral 71 schematically denotes a subregion obtained after the sides $L_1-L_4$ are divided, and a small circle represents a node on the side thus determined by the division of the side in the step 60. Here, the number of divided parts is equal for the opposing sides $L_2$ and $L_4$, but the number of divided parts varies between the sides $L_1$ and $L_3$. In this case, virtual nodes are located between nodes on the side $L_1$ having a smaller number of divided parts, where the number of virtual nodes is indicated by the difference between the number of divided parts of the side $L_3$ having a larger number thereof and that of the side $L_3$ having a smaller number thereof (step 67). In this case, since the virtual node cannot be a vertex of the element, as the number of virtual nodes increases, the density of elements after the region division lowers, consequently, it is essential that the virtual nodes should not be concentrated on a single location. In this processing, therefore, the virtual nodes are so located between the real nodes as to be dispersed therebetween. The virtual nodes to be located between the real nodes are selected according to a predetermined function, for example, a function linear with respect to the distance between the virtual nodes and an end of the side having the smaller number of divided parts. As a result, the number of real nodes becomes equal to the number of virtual nodes for a pair of the opposing sides. If a subregion is a triangular region, a side having the greatest number of real nodes is selected from three sides of the triangle. Assuming the side to be divided into two sides by an appropriate node thereon, namely, the triangle is regarded as a rectangular region, thereby applying completely the same processing thereto. Next, consider a normal coordinate region 72 having the same division number as that of the boundary sides of the subregion S1. The region 72 includes an orthogonal lattice in which the distance between the lattice points is fixed to 1. The system generates a function F which maps each lattice point on each boundary of the region 72 onto one of the real or virtual nodes on the boundary of the region 71. For example, a lattice point 77 is mapped onto a node 78 (a virtual node in this case) on the side $L_1$ of the subregion S1. Several methods can be considered to generate the mapping function. For example, as is well known, the mapping from the region 72 onto the region 71 can be defined under conditions that transformation between the coordinates satisfies the Laplace equation and that the lattice points on the boundary of the lattice region 72 are mapped onto the real or virtual nodes on the sides of the region 71. Next, among the lattice points of the region 72, the lattice points (virtual points) corresponding to the virtual nodes of the region 71 are obtained. Such virtual lattice points are indicated by X on the boundary sides of the region 72. Furthermore, among the lattice points inside the region 77, the lattice points to be regarded as the virtual lattice points are determined (step 68). The determination of the virtual lattice points inside the region is stepwise achieved such that for each determination, two virtual lattice points on the ends are removed from the group of virtual lattice points adjacent to each other on the boundary. For example, the virtual lattice points 88 and 90 on the ends are removed from the virtual lattice points 88, 89, and 90, and the lattice point 91 existing at an upper location is assumed to be a virtual lattice point. From the virtual lattice points 72 and 92, any virtual lattice point cannot be generated. Next, the region 72 is divided into small rectangular regions each comprising real lattice points as the four corner points of the rectangle. Refernce numeral 79 indicates a diagram showing the result of division. Finally, in each small rectanguler region, the real lattice points thereof are appropriately connected to each other to generate a group of rectangular elements (step 69), which are indicated by reference numeral 75. The method for connecting the lattice points need only be determined so as to minimize the length of the sides resulting from the connection.

Next, according to the mapping function F generated beforehand, the region 5 is mapped onto the region 71 to obtain the element division diagram 76. The inside of the subregion S1 has been thus divided. The other subregions are also processed in the same fashion. Thereafter, according to the region division results, the node-.element data table group (FIG. 7) is generated (step 63).

An embodiment has been described, but various changes or modifications thereof can be easily considered, for example, the shape.discretization information 1 and the mesh division processing 4 may be replaced with a CAD system, moreover, the node.element data table group 7 need not be necessarily inputted at an execution of the calculation but the table group 7 may be incorporated as a code in the calculation program 10.

Although the embodiment has been described in a case of a two-dimensional space region, the automatic generation of the programs can also be implemented for a one- or three-dimensional space region in which only the integral formula of the basis function is changed.

Since the calculation code is determined according to the equations, this method can be applied to various equations.

In addition to the kinds of basis functions of FIG. 10, basis functions of the higher order can also be easily introduced to the system by changing the integral formula and the formula for transforming equations.

The program language of the generated program is not limited to FORTRAN, for example, PL/I and PASCAL having the same level of description function as FORTRAN are applicable to the automatic program generation.

According to the present invention, the generated program code requires a reduced memory capacity for the program code execution as compared with the prior art technique.

The number of subregions to be obtained by the region division can be arbitrarily controlled, which enables one to generate a program accomplishing a numerical simulation with desired precision.

Moreover, the system enables generation of a program achieving a numerical simulation on arbitrary mathematical model without imposing any restrictions on the objective partial differential equations and boundary conditions.

We claim:

1. A method for automatically generating, by use of a computer, a program which calculates an unknown quality (A) within a calculation object region (S1, S2), based upon a finite element method, said automatic generation being performed in response to input information specifying a boundary of the calculation objective region, a division condition of the boundary, a partial differentiation equation related to the unknown quantity, and a boundary condition to be satisfied by the unknown quantity on the boundary, said method comprising the steps of:

(a) dividing the calculation objective region (S1, S2) into element regions (E1, E2, ...) according to the division condition;

(b) generating , based upon the partial differential equation, a first mathematical expression representing a portion within an arbitrary coefficient ($k_{ij}$) to be calculated for a matrix equation ($k_{ij}$) ($a_i$)=($d_i$), said portion being dependent on an element region which includes nodes ($N_i$, $N_j$) related to the coefficient, and a second mathematical expression representing a portion within an arbitrary instant ($d_i$) to be calculated for the matrix equation, said portion being dependent on an element region which includes a node ($N_i$) related to the constant, wherein a solution of the matrix equation enables the unknown quantity (A) to be represented as a linear combination ($\Sigma_j a_j \phi_j$) of basis functions $\phi_j$ each defined with respect to a respective node ($N_i$) of the element regions; and (c) generating a program which calculates the coefficients (($k_{ij}$)) and constants (($d_i$)); said program generation including the steps of (c1) generating first and second program portions based upon said first mathematical expression and generating a third program portion based upon said second mathematical expression, wherein said first program portion calculates respective first portions and respective second portions dependent upon positions of nodes ($N_i$, $N_j$, and $N_k$) of one of the element region, so as to renew, by the respective first portions, respective values already calculated for respective diagonal coefficients ($K_{ii}$, $K_{jj}$, $K_{kk}$) related to respective nodes of the one element region, and so as to renew, by the respective second portions, respective values already calculated of respective non-diagonal coefficients ($K_{ij}$, $K_{ji}$, $K_{jk}$, $K_{kj}$, $K_{ki}$, $K_{ik}$) related to respective pairs of nodes of the one element region, and wherein the second program portion calculates respective third portions dependent upon the positions of the plurality of nodes of the one element region, so as to renew, by the respective third portions respective value already calculated for a respective constants of the matrix equation ($d_i$, $d_j$, $d_k$) related to the one element region and (c3) generating a second program portion for enabling said first to third program portions to be executed for different ones of the element regions of the calculation objective region.

2. A method according to claim 1, wherein said step (b) comprises the following steps of:

(b1) determining an order of differentiation of each term contained in the inputted partial differentiation equation;

(b2) multiplying said each term by a basis function $\phi_j$ and generating integration terms each representing integration of one of the multiplied terms in the calculation objective region;

(b3) selecting from the generated integration terms an integration term associated with a term of the partial differential equation which is determined to have a second order of differentiation and replacing said selected integration term, based on the inputted boundary condition, with an integration term representing an integral in the calculation objective region and an integration term representing an integral on the boundary;

(b4) replacing the unknown quantity (A) in a plurality of integration terms obtained after the step (b3) with a linear combination $$\sum^{N_T} j a_j L_j$$

of a basis functions; and (b5) generating the first and second functions respectively defining $k_{ij}$ and constant $d_i$ from the integration terms subjected to the replace processing of the step (b4).

3. A method according to claim 1 wherein said step (a) comprises the following steps of:

(a1) dividing the calculation objective region into a plurality of subregions each comprising four boundary sides;

(a2) dividing each said side of the subregions according to the division condition specified by the input information to determine positions of a plurality of real nodes on each side;

(a3) selecting one of said subregions, for which a number of real nodes on a first side of said subregion is different from a number of real nodes on a second side opposing to said first side and determining positions of virtual nodes, a number of said virtual nodes being equal to a difference between the real nodes on the first side and the real nodes on the second side, said virtual node being added to one of the first and second sides having a smaller number of the real nodes;

(a4) determining a rectangular lattice region having lattice points on sides thereof, a number of said lattice points on each side thereof being equal to a number of real or virtual nodes on a respective one of the four sides of the one subregion;

(a5) determining a function for mapping said rectangular region onto said one subregion so that said lattice points on the sides of said rectangular lattice region are mapped onto real or virtual nodes on corresponding sides of said one subregion;

(a6) determining a plurality of sets of lattice points each set comprising plural adjacent lattice points selected from the lattice points in the rectangular lattice region, said plural lattice points being different from lattice points corresponding to the virtual nodes of said one subregion; and (a7) determining sets of nodes in the one subregion each set corresponding to one set of lattice points among said sets of lattice points, each set of nodes defining an element region of the calculation object region.

4. A method according to claim 1, wherein said step (a) further includes generation of third and fourth mathematical expressions based upon the partial differentiation equation and the boundary condition, the third mathematical expression representing a portion within an arbitrary coefficient ($k_{ij}$) related to an element region which includes nodes ($N_i$, $N_j$) on a specific part of the boundary specified by the boundary condition and said fourth mathematical expression representing a portion within an arbitrary constant ($d_i$) related to an element region which includes a node ($N_i$) located on the specific part of the boundary; and wherein the step (c) further includes the steps of (c4) generating a fourth program portion based upon the third mathematical expression, wherein said fourth program portion calculates respective fourth portions and respective fifth portions dependent upon positions of nodes of a respective one of the element regions which one has a node ($N_i$) located on the specific part of the boundary, so as to renew, by the respective fourth portions, respective values already calculated for respective diagonal coefficients ($k_{ii}$, $K_{jj}$, $K_{kk}$) related to the respective one element region and so as to renew, by the respective fifth portions, respective values already calculated for respective non-diagonal coefficients ($k_{i j}$, . . . ) related to the respective one element region, and (c5) generating a fifth program portion based upon the fourth mathematical expression, wherein said fifth program portion calculates respective sixth portions dependent upon positions of nodes of the respective one element region, so as to thereby renew respective values already calculated for constants ($d_i$, $d_j$) related to the respective one element region.

5. A method according to claim 4, wherein said step (c) further includes generation of a sixth program portion based upon indication by the boundary condition of a fixed value which the unknown quantity should take on at least a part of the boundary, wherein the sixth program portion changes coefficients and constants related to each of element regions which have nodes on the part of the boundary and already calculated by the first to the third program portions to a value solely dependent upon the fixed value.

6. A method for automatically generating, by use of a computer, a program which calculates an unknown quantity (A) within a calculation object region (S1, S2), based upon a finite element method, said generation being done in response to input information specifying a boundary of the calculation objective region, a division condition of the boundary, a partial differentiation equation related to the unknown quantity on the boundary, said method comprising the steps of:

(a) dividing the calculation objective region (S1, S2) into element regions (E1, E2, . . . ) according to the division condition;

(b) generating, based upon the partial differential equation, a first mathematical expression representing a portion within an arbitrary coefficient ($K_{ij}$) to be calculated for a matrix equation ($K_{ij}$) ($a_i$)=($d_i$), said portion being dependent on an element region which includes a node ($N_i$) related to the constant, wherein a solution of the matrix equation enables the unknown quantity (A) to be represented as a linear combination ($\Sigma_i a_i \phi_i$) of basis functions $\phi_i$ each defined with respect to a respective node ($N_i$) of the element regions; and (c) generating a program which calculates the coefficients (($K_{ij}$)) and the constant (($d_i$)) based upon the first and second mathematical expressions and upon position of nodes of element regions determined as a result of the division;

wherein the step (b) includes the steps of (b1) judging an order of differentiation of each term contained in the inputted partial differentiation equation, (b2) multiplying said terms each by a basis function $\phi_i$ and generating integration terms each representing integration of one of the multiplied terms in the calculation objective region, (b3) selecting from the generated integration terms an integration term associated with a term of the partial differentiation equation judged to have a second order of differentiation and replacing said selected integration term, based on the inputted boundary condition, with an integration term representing an integral in the calculation objective region and an integration term representing an integral on the boundary, (b4) replacing the unknown quantity (A) in a plurality of integration terms obtained after the step (b3) with a linear combination $\Sigma_j a_j \phi_j$ of the basis functions, and (b5) generating the first and second functions respectively defining $k_{ij}$ and constant $d_i$ from the integration terms subjected to the replace processing of the step (b4).

7. A method executed by a computer for automatically dividing a calculation objective region having four sides into element regions, comprising the steps of:
 (a1) dividing each side of the calculation objective region according to a division condition specified by input information to determine positions of a plurality of real nodes on each code;
 (a2) detecting whether or not a number of real nodes determined by the division condition on a first side of said calculation objective region is different from a number of real nodes determined by the division condition on a second side opposing to said first side and determining positions of virtual positions of virtual nodes when the difference is detected, a number of said virtual nodes being equal to a difference between the real nodes on the first side and the real nodes on the second side, said virtual node being added to one of the first and second sides having a smaller number of real nodes;
 (a3) determining a rectangular lattice region having lattice points on sides thereof, a number of said lattice points on each side thereof being equal to a number of real or virtual nodes on a respective one of the four sides of the calculation objective region;
 (a4) determining a function for mapping said rectangular region onto said calculation objective region so that said lattice points on the sides of said rectangular lattice region are mapped onto real or virtual nodes on corresponding sides of side calculation objective region;
 (a5) determining a plurality of sets of lattice points each set comprising plural adjacent lattice points selected from the lattice points in the rectangular lattice region, said plural lattice points being different from lattice points corresponding to the virtual nodes of said calculation objective region; and
 (a6) determining sets of nodes in the calculation objective region each set corresponding to one set of lattice points among said sets of lattice points, each sets of nodes defining an element region of the calculation object region.

* * * * *